United States Patent
Jagadeesan et al.

(10) Patent No.: US 12,242,989 B2
(45) Date of Patent: Mar. 4, 2025

(54) CENTRALIZED SKILLS MANAGEMENT VIA SKILLS INFERENCE WITHIN CONTEXT OF GLOBAL SKILLS GRAPH

(71) Applicant: Microsoft Technology Licensing, LLC, Redmond, WA (US)

(72) Inventors: Srivathsan Jagadeesan, Sammamish, WA (US); Swati Jhawar, San Jose, CA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 233 days.

(21) Appl. No.: 17/696,313

(22) Filed: Mar. 16, 2022

(65) Prior Publication Data

US 2023/0297908 A1    Sep. 21, 2023

(51) Int. Cl.
    *G06Q 10/0631*    (2023.01)
    *G06Q 10/105*     (2023.01)

(52) U.S. Cl.
    CPC ... *G06Q 10/063112* (2013.01); *G06Q 10/105* (2013.01)

(58) Field of Classification Search
    CPC .............................................. G06Q 10/063112
    See application file for complete search history.

(56) References Cited

U.S. PATENT DOCUMENTS 10,354,017 B2    7/2019 Skomoroch et al.
10,380,552 B2    8/2019 Zhang et al.
(Continued)

FOREIGN PATENT DOCUMENTS

| CN | 109918483 B | 7/2021 |
|----|-------------|--------|
| CN | 113439279 A | 9/2021 |
| WO | 2020003325 A1 | 1/2020 |

OTHER PUBLICATIONS

Cornerstone skills graph helps organisations and their people instantly map skills and effectively respond to rapid change. (Sep. 17, 2020). M2 Presswire Retrieved from https://dialog.proquest.com/professional/docview/2443757697?accountid=131444 (Year: 2020).*

(Continued)

*Primary Examiner* — Johnna R Loftis
(74) *Attorney, Agent, or Firm* — Foley IP Law, PLLC

(57) ABSTRACT

A centralized skills management server, a computer-readable storage medium, and a computer-implemented method for skills inference are described herein. The method includes executing a web-based application on a remote computing system operated by a user associated with a tenant and extracting skills-related terms associated with the execution of the web-based application. The method includes interfacing with the global skills graph via an API and importing standardized skill tags relating to the extracted skills-related terms. The method also includes accessing a property graph including data objects corresponding to the tenant that include object metadata with incorporated standardized skill tags, extracting a portion of the data objects including object metadata with incorporated standardized skill tags that match the imported standardized skill tags relating to the skills-related terms, and surfacing a skills-related functionality on the display of the remote computing system, where the skills-related functionality utilizes the extracted portion of the data objects.

18 Claims, 12 Drawing Sheets

(56) References Cited

U.S. PATENT DOCUMENTS

| | | | |
|---|---|---|---|
| 10,380,701 | B2 | 8/2019 | Lin et al. |
| 10,462,255 | B2 | 10/2019 | Schissel et al. |
| 10,902,061 | B2 | 1/2021 | Chen et al. |
| 11,164,153 | B1 | 11/2021 | Hinton et al. |
| 2009/0177597 | A1* | 7/2009 | Dube .................. H04L 67/535 706/12 |
| 2014/0278633 | A1 | 9/2014 | Daly et al. |
| 2014/0310037 | A1 | 10/2014 | Griffin et al. |
| 2015/0127567 | A1 | 5/2015 | Menon et al. |
| 2015/0242795 | A1* | 8/2015 | Hilton ............ G06Q 10/06398 705/7.42 |
| 2015/0317376 | A1* | 11/2015 | Bauer ................. G06F 16/285 707/737 |
| 2016/0092998 | A1 | 3/2016 | Goel |
| 2016/0098663 | A1 | 4/2016 | Skiba |
| 2017/0068922 | A1 | 3/2017 | Singh et al. |
| 2019/0066030 | A1 | 2/2019 | Hancock |
| 2019/0340945 | A1 | 11/2019 | Malhotra et al. |
| 2020/0090053 | A1 | 3/2020 | Silverman |
| 2020/0126022 | A1* | 4/2020 | Gaspar .............. G06Q 10/1053 |
| 2020/0242714 | A1 | 7/2020 | Doti et al. |
| 2021/0044699 | A1 | 2/2021 | Thalange |
| 2021/0295822 | A1 | 9/2021 | Tomkins et al. |
| 2021/0357378 | A1 | 11/2021 | Urdiales |
| 2022/0020282 | A1* | 1/2022 | Elewitz .............. G06F 16/2246 |
| 2022/0058482 | A1* | 2/2022 | Yu ......................... G06N 3/044 |
| 2022/0147945 | A1* | 5/2022 | Yoshikawa .... G06Q 10/063118 |
| 2022/0188659 | A1 | 6/2022 | Krasnoslobodtsev |
| 2023/0132465 | A1* | 5/2023 | Kumar .......... G06Q 10/063112 705/7.14 |
| 2023/0297927 | A1 | 9/2023 | Jagadeesan et al. |

OTHER PUBLICATIONS

"2021 Workplace Learning Report", Retrieved from: https://learning.linkedin.com/resources/workplace-learning-report, Retrieved on Jan. 4, 2022, 8 Pages.

"Aligning Your Entire Organization Around the Customer", Retrieved from: https://web.archive.org/web/20211116172619/https:/www.quantummetric.com/harvard-business-review-analytic-services-report/, Nov. 16, 2021, 2 Pages.

Aderhold, et al., "Cobrainer Technology Whitepaper", In Technology Whitepaper of Cobrainer 2020, Jan. 2020, 8 Pages.

Bersin, Josh, "In A Bold And Aggressive Move, LinkedIn Unleashes Its LXP And More", Retrieved from: https://joshbersin.com/2021/04/in-a-bold-and-aggressive-move-linkedin-unleashes-its-lxp-and-more/, Apr. 20, 2021, 5 Pages.

Garland, Stacia, "Everything You Need to Know About Skill Testing", Retrieved from: https://vervoe.com/skill-testing/, Jun. 22, 2020, 20 Pages.

Guo, et al., "The AI Behind LinkedIn Recruiter Search and Recommendation Systems", Retrieved from: https://engineering.linkedin.com/blog/2019/04/ai-behind-linkedin-recruiter-search-and-recommendation-systems, Apr. 22, 2019, 10 Pages.

Ignatius, Adi, "The Real Deal on Data", In Harvard Business Review vol. 98 , Issue 1, Jan. 1, 2020, 2 Pages.

Laprade, et al., "The Enterprise Guide to Closing the Skills Gap", In IBM Institute for Business Value 2019, Sep. 2019, 20 Pages.

Mat, Cyrill, "What Is the Cornerstone Skills Graph?", Retrieved from: https://www.cornerstoneondemand.com/resources/article/what-cornerstone-skills-graph/, Oct. 5, 2020, 7 Pages.

Roslansky, Ryan, "You Need a Skills-Based Approach to Hiring and Developing Talent", Retrieved from: https://hbr.org/2021/06/you-need-a-skills-based-approach-to-hiring-and-developing-talent, Jun. 8, 2021, 6 Pages.

Schwartz, et al., "Rewriting The Rules For The Digital Age", In 2017 Deloitte Global Human Capital Trends , Deloitte University Press, 144 Pages.

Ung, Elisa, "The Human-Centered CEO", Retrieved from: https://www.forbes.com/sites/insights-ey/2021/07/01/the-human-centered-ceo/?sh=7675bb9f65a5, Jul. 1, 2021, 4 Pages.

"Build Talent with Skills you Need", Retrieved From: https://www.cornerstoneondemand.com/uk/solutions/skills-graph/, Retrieved On: Jan. 29, 2022, 10 Pages.

Gugnani, et al., "Generating Unified Candidate Skill Graph for Career Path Recommendation", In Proceedings of International Conference on Data Mining Workshops, Nov. 17, 2018, pp. 328-333.

Jia,, et al., "Representation of Job-Skill in Artificial Intelligence with Knowledge Graph Analysis", In Proceedings of IEEE Symposium on Product Compliance Engineering—Asia (ISPCE-CN), Dec. 5, 2018, 6 Pages.

Kivimaki, et al., "A Graph-Based Approach to Skill Extraction from Text", In Proceedings of TextGraphs-8 Graph-Based Methods for Natural Language Processing, Oct. 18, 2013, pp. 79-87.

"International Search Report and Written Opinion Issued in PCT Application No. PCT/US22/053295", Mailed Date: Apr. 25, 2023, 12 Pages.

"International Search Report and Written Opinion Issued in PCT Application No. PCT/US22/053903", Mailed Date: May 10, 2023, 10 Pages.

Final Office Action mailed on Sep. 16, 2024, in U.S. Appl. No. 17/696,284, 15 pages.

Non-Final Office Action mailed on May 9, 2024, in U.S. Appl. No. 17/696,284, 20 pages.

* cited by examiner

400

| Overview | Contact | Organization | Files | LinkedIn |

John Doe ☆
Information Security Analyst
✎ Update your profile

Contact information

✉ Work email
Johndoe@tenant.com

✉ Email
John@doe.me

📞 Mobile
+1 (234) 5678910

📞 Work phone
+2(134)5678910

📍 Address
123, 456th St, 54388

🏢 Company
Tenant

@ Alias
john doe

- Cost center
10213049

👤 Add to contacts

About me

Projects
- Vision 2
- Project 1

Schools and Education
- University
- Technical University

Skills and Expertise — 402
Threat Modeling
Data Loss Prevention
Security Assessment
Digital Forensics
Executive Communication 404 — All Files

Good morning

Recommended

John Doe
PRINCIPAL SECURITY
PROGRAM MGR
jdoe | Security Engineering

Industrial
Cybersecurity

Book
Company | Orielly Learning
25 mins

Security
Management

Skills needed:
Security Governance,
Incident Response, Risk....

Security Operations Manager II
San Jose, California, United States.
Aug 19th 2021

All  My recent  Shared  Favorites

Type to filter list   ↑ Upload

| Name | Modified ˅ | Shared by ˅ | Activity ˅ |
|---|---|---|---|
| Document 1<br>John Doe's Files | 9m ago | Adam | You frequently open this<br>54m ago |
| Document 2<br>John Smith's Files | 9m ago | you | John shared this in a....<br>15m ago |
| Powerpoint 1<br>Employee Experience (EXP) - Skills | 11m ago | | Jack edited this<br>15m ago |
| Powerpoint 2<br>Jane Doe's Files | 1h ago | Jane | Jane shared this in a....<br>Sep 24 |
| Document 3<br>Employee Experience (EXP) | 1h ago | Tina | Tina commented on this<br>Tue at 1:39 PM |

FIG. 7

CENTRALIZED SKILLS MANAGEMENT VIA SKILLS INFERENCE WITHIN CONTEXT OF GLOBAL SKILLS GRAPH

BACKGROUND

The present disclosure relates to skills management within the employer/employee context. In particular, the present disclosure relates to centralized skills management via skills inference within the context of a global skills graph and a tenant-specific property graph, which enables the surfacing of skills-related functionalities during the execution of a web-based application, such as an employee experience application.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

In an embodiment described herein, a method for skills inference within the context of a global skills graph and a tenant-specific property graph is described. The method is implemented in a computing system including a processor. The method includes executing, via a network, a web-based application on a remote computing system operated by a user associated with a tenant and extracting, via the processor, skills-related terms associated with the execution of the web-based application. The method includes interfacing with a global skills graph via an API and importing standardized skill tags from the global skills graph, where the imported standardized skill tags relate to the extracted skills-related terms associated with the execution of the web-based application. The method also includes accessing a property graph including data objects corresponding to the tenant, where the data objects include object metadata with incorporated standardized skill tags. The method further includes extracting a portion of the data objects including object metadata with incorporated standardized skill tags that match the imported standardized skill tags relating to the extracted skills-related terms, as well as surfacing, via the network, a skills-related functionality on the display of the remote computing system during the execution of the web-based application, where the skills-related functionality utilizes the extracted portion of the data objects.

In another embodiment, a centralized skills management server is described. The centralized skills management server includes a processor, a web-based application, and a communication connection for connecting a remote computing system to the centralized skills management server through a network, where the remote computing system is operated by a user associated with a tenant. The centralized skills management server also includes a computer-readable storage medium operatively coupled to the processor. The computer-readable storage medium includes computer-executable instructions that, when executed by the processor, cause the processor to execute, via the network, the web-based application on the remote computing system, to extract skills-related terms associated with the execution of the web-based application, and to interface with a global skills graph via an API. The computer-executable instructions, when executed by the processor, also cause the processor to import standardized skill tags from the global skills graph, where the imported standardized skill tags relate to the extracted skills-related terms associated with the execution of the web-based application, as well as to access a property graph including data objects corresponding to the tenant, where the data objects include object metadata with incorporated standardized skill tags. The computer-executable instructions, when executed by the processor, further cause the processor to extract a portion of the data objects including object metadata with incorporated standardized skill tags that match the imported standardized skill tags relating to the extracted skills-related terms associated with the execution of the web-based application, as well as to surface, via the network, a skills-related functionality on the display of the remote computing system during the execution of the web-based application, where the skills-related functionality utilizes the extracted portion of the data objects.

In another embodiment, a computer-readable storage medium is described. The computer-readable storage medium includes computer-executable instructions that, when executed by a processor, cause the processor to execute, via a network, a web-based application on a remote computing system operated by a user associated with a tenant, to extract, via the processor, skills-related terms associated with the execution of the web-based application, and to interface with a global skills graph via an API. The computer-executable instructions, when executed by the processor, also cause the processor to import standardized skill tags from the global skills graph, where the imported standardized skill tags relate to the extracted skills-related terms associated with the execution of the web-based application, as well as to access a property graph including data objects corresponding to the tenant, where the data objects include object metadata with incorporated standardized skill tags. The computer-executable instructions, when executed by the processor, further cause the processor to extract a portion of the data objects including object metadata with incorporated standardized skill tags that match the imported standardized skill tags relating to the extracted skills-related terms, as well as to surface, via the network, a skills-related functionality on the display of the remote computing system during the execution of the web-based application, where the skills-related functionality utilizes the extracted portion of the data objects.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

The following detailed description may be better understood by referencing the accompanying drawings, which contain specific examples of numerous features of the disclosed subject matter.

FIG. 4 is a schematic view of a user interface including standardized skill tags listed on a user profile according to embodiments described herein;

FIG. 6 is a schematic view of a user interface including skills-related search results according to embodiments described herein;

FIG. 7 is a schematic view of a user interface including skills-based recommendations according to embodiments described herein;

DETAILED DESCRIPTION

Figure 1A:
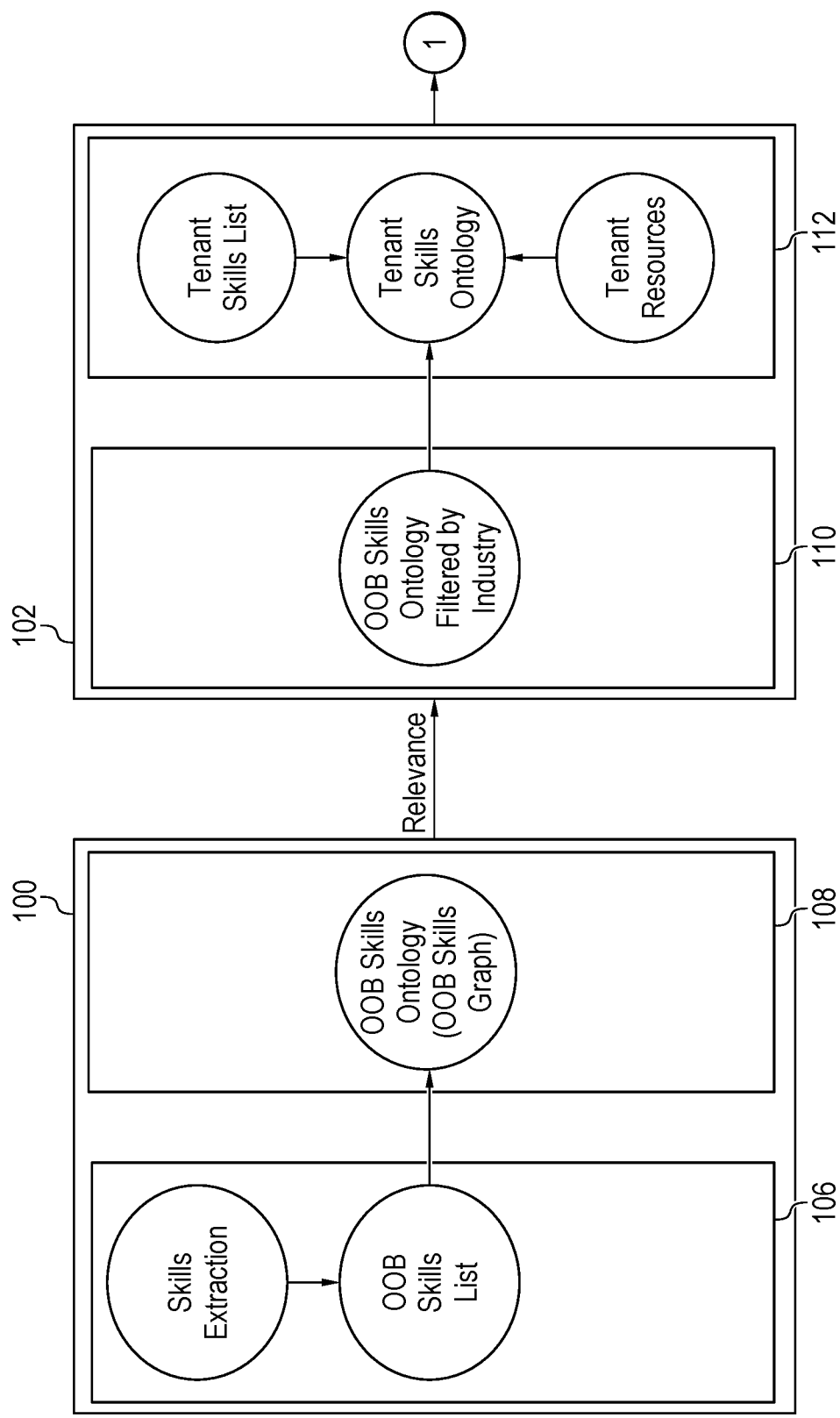
FIGS. 1A and 1B are a schematic view depicting several conventional skills management solutions.

As a preliminary matter, some components shown in the figures are described herein in the context of one or more structural components, referred to as functionalities, modules, features, elements, etc. However, the components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include computing systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, the terms "component," "system," "client," and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable storage medium.

Moreover, as used herein, the term "computer-readable storage medium" refers to an article of manufacture. In general, computer-readable storage media are used to host, store and/or reproduce computer-executable instructions and data for later retrieval and/or execution. When the computer-executable instructions that are hosted or stored on the computer-readable storage media are executed by a processor of a computing system, the execution thereof causes, configures and/or adapts the executing computing system to carry out various steps, processes, routines, methods and/or functionalities, including the steps, processes, routines, methods, and/or functionalities described herein. Examples of computer-readable storage media include, but are not limited to, optical storage media (such as Blu-ray discs, digital video discs (DVDs), compact discs (CDs), optical disc cartridges, and the like), magnetic storage media (such as hard disk drives, floppy disks, magnetic tape, and the like), memory storage devices (such as random access memory (RAM), read-only memory (ROM), memory cards, thumb drives, and the like), and cloud storage (such as online storage services). Computer-readable storage media may deliver computer-executable instructions to a computing system for execution via various transmission means and mediums, including carrier waves and/or propagated signals. However, for purposes of this disclosure, the term "computer-readable storage medium (or media)" refers specifically to non-transitory forms of computer-readable storage media and expressly excludes carrier waves and/or propagated signals.

Maintaining a skilled workforce is pivotal to an organization's success. Consider a retail company implementing an omni-channel strategy, an automobile company moving into the electric vehicle market, or a healthcare company learning to deal with a new pandemic disease. In each case, expanding the organization to cover the new area of interest requires the organization to adapt to entire systems of new skills and to train their employees with such skills. The more skilled the employees are, the more efficient they will be in innovating and producing results. To this end, organizations are increasingly focusing on training in-house talent by providing opportunities and resources that map to employees' skills and aspirations, as well as competing to hire the best talent to fill skill gaps. In today's marketplace, skills management is viewed as a key investment area for organizations, with many organizations investing in some type of skills management solution and/or purchasing skills datasets, where the term "skill" as used herein generally refers to the ability to perform a particular task and/or to fit a particular role. Some non-limiting examples of skills include communication skills, software development skills, data management skills, networking skills, leadership skills, and the like.

The demand to develop new skills holds true at the employee level as well. In general, skills become obsolete relatively quickly, with more technical skills becoming obsolete most rapidly. Therefore, adapting with skill trends is imperative to remain relevant in the high-paid skills market. Given this situation, employees are becoming increasingly concerned with steering their own ongoing skills development, and many employees expect their employers to support them in this journey.

Within the skills management domain, customer needs vary depending on whether the customer is an employee, a manager/employer, or an overall organization. More specifically, from the employee's perspective, skills management solutions are helpful for personal development, career advancement, job searching, job retention, and networking purposes, for example. From the manager's/employer's perspective, skills management solutions are helpful for team hiring, onboarding, and assignment planning/staffing purposes, for example. Moreover, from the overall organization's perspective, skills management solutions are helpful for organization transformation, talent deployment, leadership hiring/succession planning, and mergers and acquisitions purposes, for example. To summarize, skills-pivoted solutions help organizations to identify which skills are already possessed by the organization, as well as to identify skill gaps that should be filled, enabling organizations to stay relevant while preparing for the future. In addition, skills-pivoted solutions help organizations to surface skills-based resources, opportunities, and connections to employees, thus making "skilling" ubiquitous, always available, and a natural part of work.

However, despite all the potential benefits of skills management solutions, such solutions are still lacking. For example, according to current skills management techniques, organizations typically maintain user data and resources in silos across human resource (HR) solutions, skill-tagged with taxonomies that barely align. More specifically, organizations currently use multiple purpose-built solutions or providers to solve core HR problems, such as master data management, recruiting, learning, and talent development. The market is fragmented, with each tool using a unique skills taxonomy. This fragmentation between the tools and the datasets affects an organization's ability to have an all-up understanding of its skills and to provide a seamless experience to its employees. Furthermore, organizations generally prefer their internal skills library to be derived from their organizational needs and values. As a result, organizations tend to build their own skills databases, in which tenant resources distributed across systems are tagged with different skills taxonomies. However, this approach creates inefficiencies in surfacing relevant resources to employees in a seamless manner, as well as inefficiencies in generating a combined view of the skills possessed by the organization's employees.

In addition, the lack of integration among current skills management solutions restricts an employee's ability to understand, develop, and utilize their skills in a complete manner. In general, such lack of integration forces employees to jump between non-coherent user experiences in various applications and tools, often outside the flow of their everyday work, to discover opportunities, content, and connections related to skills they possess and/or wish to acquire. For an employee, this is nonproductive and frustrating, resulting in low adoption rates across most HR solutions.

Turning now to details regarding the skills management landscape, the following list of definitions provides additional context for the discussion that is to follow:

The term "skills ontology" refers to the process of defining and measuring relationships between skills. In particular, skills ontology can be used to aid in the generation of skills graphs that define relationships between skills. Stated more broadly, skills ontology may be viewed as the common language of skills with respect to a particular industry or tenant.

The term "skills taxonomy" refers to a hierarchical system of skill classification that can categorize and organize skills in groups or clusters. Generally speaking, skills taxonomy takes the form of a tree, while skills ontology takes the form of a graph.

The term "skills inference" refers to the ability of a system to automatically determine (or "infer") skills related to particular text or signals, for example.

The term "skill validation" refers to the process of validating artificial intelligence (AI)-inferred skills with the user to ensure accuracy. Advanced systems also use endorsements by colleagues, peers, and/or managers and, in some cases, tests or assessments to validate the AI-inferred skills.

As used herein, the term "tenant" refers to a particular organization or other type of entity for which skills management solutions are implemented. Generally speaking, each tenant is defined by a number of computing systems that are operated by users who are associated with the tenant. For embodiments in which the tenant is a particular organization, such users may include, for example, employees, managers, administrators, owners, and the like corresponding to the organization.

The term "tenant skills list" refers to a list of skills generated at the tenant level based on skills that are relevant to the tenant.

The term "tenant skills ontology" refers to tenant skills lists mapped onto a skills management provider's skills ontology to generate a tenant skills graph. This tenant skills ontology can then be used to power employee experiences at the tenant level. However, as described herein, the tenant skills ontologies provided by current skills management systems suffer from fragmentation issues that negatively impact such employee experiences.

Figure 1B:
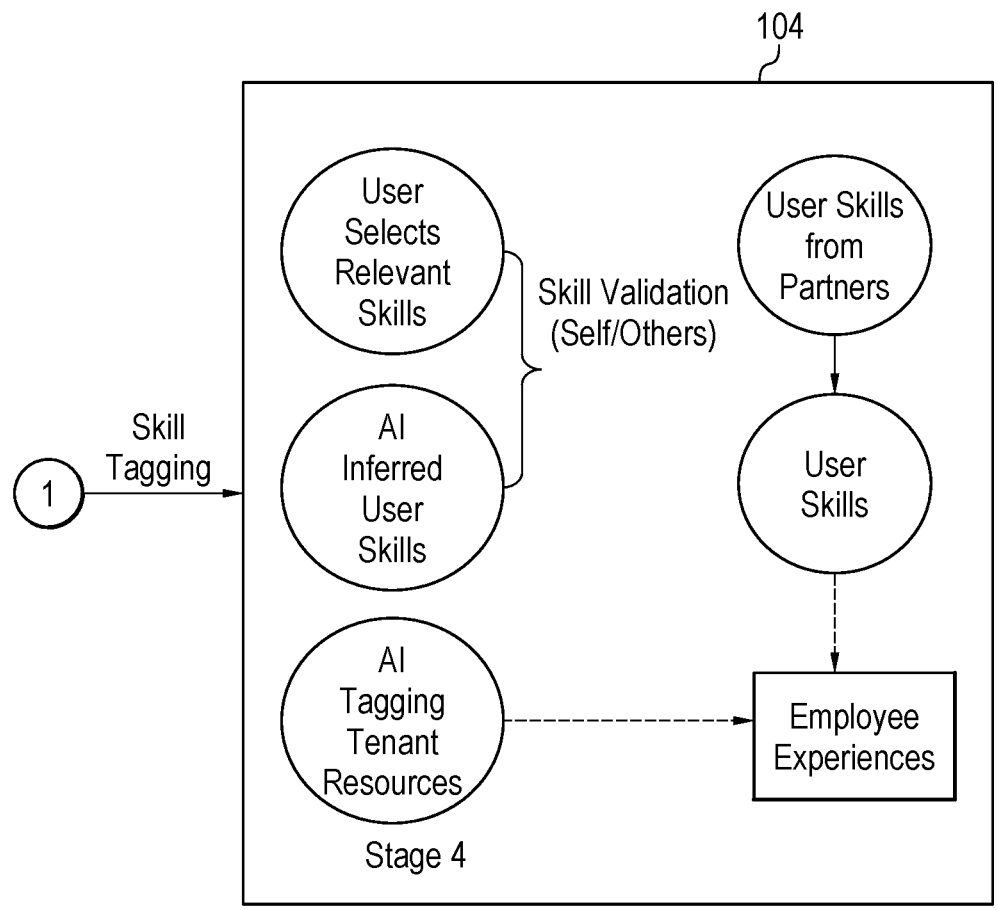

FIGS. 1A and 1B are a schematic view depicting several conventional skills management solutions. Specifically, FIGS. 1A and 1B show an "Out of Box" (OOB) skills ontology solution 100, a tenant skills ontology solution 102, and a user experience solution 104. The OOB skills ontology solution 100 involves building an OOB skills ontology. For this solution, skills are extracted and mapped using AI models to generate an OOB skills graph that is scalable and maintainable. The tenant skills ontology solution 102 involves building a tenant-level skills ontology on top of an OOB skills ontology. For this solution, skills management providers offer APIs that take tenant skills lists and/or tenant-specific resources as input and then build the relevant tenant-level skills ontology on top of the provider's OOB skills ontology. Moreover, the user experience solution 104 involves surfacing relevant employee experiences. For this solution, resources in the provider's system are tagged with the skills ontology to surface employee experiences and insights.

Turning now to more specific details of the three skills management solutions that typically exist in the market today, the OOB skills ontology solution 100 includes two stages 106 and 108. During the first stage 106, skills are extracted on a constant basis to generate an OOB skills list. In particular, skills are typically extracted by scraping text documents, such as resumes and job descriptions, to determine relevant skills. During the second stage 108, the OOB skills ontology is created, generating an OOB skills graph. The OOB skills graph is used to define the relationships between the skills, where every skill is a node that connects to one or more other nodes. Moreover, every time a new skills list is input, the new skills list is mapped into the OOB skills graph.

The tenant skills ontology solution 102 also typically includes two stages 110 and 112. In particular, during the first stage 110, a previously-generated OOB skills ontology (such as the one generated via the OOB skills ontology solution 100) is filtered by industry and is used as the starting point for skills management for most organizations, especially organizations that do not maintain their own tenant skills lists. During the second stage 112, the skills ontology evolves using the tenant skills list for a particular tenant (e.g., organization), resulting in the generation of a tenant skills ontology on top of the OOB skills ontology. The generated tenant skills ontology is highly relevant to the particular tenant and is designed to serve the tenant's specific business needs, such as those defined based on tenant resources (e.g., job titles and the like).

Finally, the user experience solution 104 involves using a previously-generated tenant skills ontology (such as the one generated via the tenant skills ontology solution 102) to tag tenant-specific resources, such as jobs, feedback, documents, and the like, using AI techniques. In addition, this stage involves performing AI-inferred tagging of user skills, as well as allowing the user to select relevant skills. The AI-inferred and user-selected skills may then go through a skill validation process in which the user validates/invalidates the AI-inferred skills and other users validate/invalidate the user-selected skills. In addition, in some cases, partners are able to define user skills. This results in the generation of user skills lists, which can then be used to provide skills-related employee experiences.

However, these conventional skills management solutions suffer from several drawbacks. In particular, providers are still finding it difficult to provide value to organizations and to drive engagement using such approaches. There are several reasons for this. First, organizations do not just need relevant skills ontology to tag resources in one provider's system. Instead, organizations need a relevant skills ontology to consistently tag resources across all relevant resources. However, most providers only offer walled-garden solutions to organizations. This results in resources being tagged differently by different systems, creating inconsistencies in surfacing relevant resources in employee experiences. For instance, one system may tag an item as "teamwork," while another system may tag the same item as "partnership." Now, if an employee searches for a skill term "collaboration," none of these items will surface.

Second, employees want a holistic experience that covers all their needs and is purpose-built and simple to use. In general, today's employees are forced to use multiple fragmented HR systems. It would be much more convenient for employees to access the relevant resources in a seamless way, irrespective of fragmented HR systems, to let them execute to their full potential and stay productive.

Therefore, the present techniques solve this issue by providing a centralized skills management system that enables skills inference within the context of a global skills graph and a tenant-specific property graph that encompasses diverse tenant data sources (e.g., content, documents, positions, user profiles, learning paths, and the like), as well as multiple providers within the tenant's ecosystem. More specifically, the skills inference techniques described herein are enabled via the consistent, standardized skill tagging of data objects obtained from such diverse tenant data sources and providers. Moreover, such skills inference techniques can be used to provide skills-related search and recommendation functionalities at the level of individual users associated with the particular tenant. Such functionalities can be provided both in the flow of work and outside the flow of work, e.g., using standard tenant-specific data objects generated during the normal course of work and nonstandard tenant-specific data objects generated outside the normal course of work. In this manner, the present techniques enable the surfacing of simple, intuitive, and holistic skills-related employee experiences that span across diverse tenant-level data sources and providers.

The centralized skills management system described herein provides numerous advantages as compared to previous skills management solutions. As an example, the centralized skills management system provides a centralized skills ontology that is continuously updated and maintained and is highly relevant to a large number of different tenants and industries. As another example, the centralized skills management system can be automatically utilized by tenants with very little manual intervention. As another example, the architecture behind the centralized skills management system is readily scalable to large enterprise customers with diverse resources that are distributed across multiple HR solutions or providers. As another example, new tenants can be quickly integrated into the centralized skills management system, providing fast and efficient positive outcomes for such tenants. As another example, the centralized skills management system is designed to adapt with the ever-evolving skills market, with the expectation that skills will be continuously added and/or modified. As yet another example, the centralized skills management system connects resources and data across various providers to enable individual employees, as well as organizations as a whole, to seamlessly pursue their skills-related goals without accessing multiple fragmented systems.

As an example, consider an organization that utilizes System 1 for hiring, System 2 for learning, and System 3 for human capital management (HCM). According to current techniques, users associated with such organization are unable to effectively discover skills-relevant jobs, learning, connections, and the like in a coherent way through a single skills language. Therefore, the present techniques provide for the application of a universal skills language (e.g., in the form of standardized skill tags) to various tenant data sources obtained from a property graph, including, for example, data objects relating to jobs, learning content, teams, communities, mentors, and the like. This, in turn, enables skills-related functionalities, such as search- and/or recommendation-based functionalities, to be provided to the users associated with the tenant. Moreover, such skills-related functionalities can be provided to users both in the flow of work and outside the flow of work. As an example, skills-related recommendations (e.g., job recommendations, position recommendations, learning content recommendations, networking recommendations, and the like) may be automatically provided to users during execution of an employee experience application, providing a holistic, skills-based employee experience that is lacking according to current skills management techniques. As another example, each user's employee profile may be automatically updated with the user's latest skills, as evidenced by the skills inferred from the user's activity with respect the property graph. As another example, skills-related search results may be automatically integrated into the search results obtained during execution of the employee experience application. More specifically, because the tenant-level data objects are modified to include standardized skills tags within the object metadata, search results may automatically surface data objects associated with the skills-related search terms, in addition to the data objects that are matched based on titles, descriptions, and the like.

According to embodiments described herein, the centralized skills management system accomplishes the aforementioned goals by solving the core problem of fragmentation within the skills management domain. In particular, the centralized skills management system provides a skills inference functionality that enables integrated skills-driven experiences across the tenant's entire ecosystem. This is achieved, at least in part, by providing systems and methods for skills inference within the context of a global skills graph and a tenant-specific property graph. More specifically, such skills inference is enabled, at least in part, by the standardized skill tagging of tenant-level data objects using skills-related terms that define a universal skills language. Such standardized skill tagging is enabled using skills obtained from the global skills graph in combination with data objects obtained from the tenant-specific property graph, which includes content relating to a large number of diverse users and providers (e.g., application service providers) relating to the particular tenant.

One non-limiting example of a suitable global skills graph is the LinkedIn® Skills Graph, which is maintained by LinkedIn Corporation. The LinkedIn® Skills Graph is a global skills graph that forms a large-scale skills taxonomy with over 36,000 skills. The skills within the LinkedIn® Skills Graph are defined, updated, and maintained within the context of LinkedIn's professional networking environment, which supports over 24 million job postings and over 740 million members.

Figure 2:
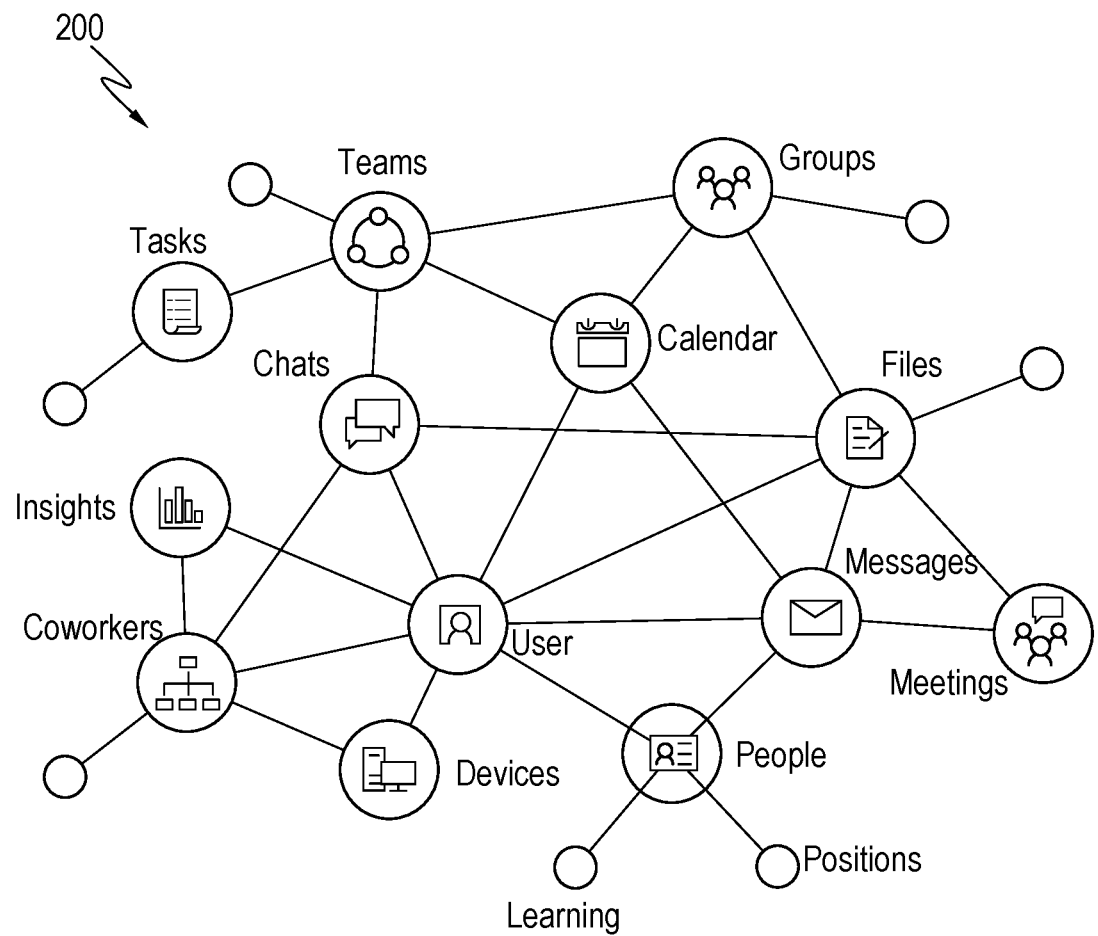
FIG. 2 is a simplified schematic view of Microsoft® Graph.

In addition, one non-limiting example of a suitable property graph that may be utilized according to embodiments described herein is Microsoft® Graph, which is provided by Microsoft Corporation. FIG. 2 is a simplified schematic view of Microsoft® Graph 200. As shown in FIG. 2, Microsoft® Graph 200 is a large property graph that includes the data underlying various Microsoft® applications and services, including (but not limited to) the suite of Microsoft 365® applications. Such applications include Microsoft® Viva®, Microsoft® Excel®, Microsoft® Word®, Microsoft® Teams®, Microsoft® PowerPoint®, Microsoft® Outlook®, Microsoft® OneNote®, Microsoft® OneDrive®, Microsoft® SharePoint®, and Microsoft® Yammer® (among others). Microsoft® Graph 200 also includes data that forms the backbone of Microsoft's cloud computing platform, Microsoft® Azure®. Moreover, the data within Microsoft® Graph 200 may be accessed and utilized to build new applications and/or to expand existing applications. Such functionality is provided via a corresponding API, which is generally referred to as the Microsoft® Graph API and is currently accessible at graph.microsoft.com.

As shown in FIG. 2, a property graph, such as Microsoft® Graph 200, includes data about various types of tenant resources. Such data may include, for example, data objects relating to users, teams, chats, tasks, insights, coworkers, groups, calendars, files, messages, meetings, people, devices, learning, and positions. Such data may be viewed from the perspective of the corresponding tenant and/or from the perspective of a specific user (e.g., a manager or employee) associated with the corresponding tenant.

Within a property graph, such as Microsoft® Graph 200, such data objects are represented as nodes. The relationships and/or interactions between the data objects are then represented using edges that connect the nodes within the property graph. As a few non-limiting examples, edges in the property graph might indicate that a particular user modified a particular document, that a particular user is working with another user, that certain resources are popular with particular users, that a particular tenant includes a specific organizational structure, that a tenant is searching for candidates for a particular position, and/or that a particular user is learning about a certain topic.

Furthermore, it should be noted that Microsoft® Graph 200 is not limited to data obtained from Microsoft® applications and services. Rather, techniques exist to enable third-party application providers to incorporate their own data into Microsoft® Graph. In some cases, this is achieved using an "owner+decorator" model, in which a given resource or entity in the property graph is mastered by one provider (e.g., Microsoft®) and then "decorated" with additional data by other third-party application providers. However, regardless of the technique utilized to incorporate such third-party data, the resulting property graph includes a wide variety of data objects that span across a wide variety of providers.

Turning now to exemplary details of the skills inference techniques described herein, such skills inference techniques are enabled, at least in part, by the standardized skill tagging of data objects within the corresponding property graph. In various embodiments, such standardized skill tagging is performed by accessing the property graph for a particular tenant and extracting skills-related terms from the object metadata corresponding to the data objects within the property graph. More specifically, in various embodiments, the skill-tag standardizer described herein obtains the skills-relevant object metadata through a set of APIs, e.g., by taking either text or other object identifiers or object properties in the property graph as the input. Exemplary types of data objects that may be input to the skill-tag standardizer for a particular user include (but are not limited to): (1) key phrases (extracted knowledge) from e-mails, public chats, documents, and the like, which capture the user's presence in the property graph; (2) text data found in the corresponding user profile (e.g., the Microsoft 365® user profile); and (3) signals received regarding trainings undertaken within an application, such as an employee experience application (e.g., within a "Viva Learning" portion of Microsoft® Viva®), and other such skills-related actions. Additional exemplary types of data objects that may be input to the skill-tag standardizer for the particular tenant include (but are not limited to): (1) text data corresponding to job descriptions, course descriptions, and the like; and (2) data relating to which users in the property graph engage with particular data objects (e.g., the skills of the members of a particular Microsoft® Teams® team or a particular Microsoft® Yammer® community can be aggregated and used as an input to the skill-tag standardizer). In general, it should be noted that, while such data objects are primarily described herein with reference to the "object metadata," the term "object metadata" as used herein is intended to be inclusive of other features and properties of the corresponding data objects. Generally, the skill-tag standardizer described herein is configured to skill-tag any type of tenant-level data object that exists within the property graph, as long as such data object encompasses one or more skills-related terms. Furthermore, in various embodiments, the extraction of the skills-related terms from the object metadata may be accomplished, at least in part, using AI-based techniques, such as, for example, natural language processing (NLP) techniques.

In some embodiments, the skill-tag standardizer then anonymizes the aggregated object metadata to protect tenant and user privacy. According to embodiments described herein, the skill-tag standardizer then interfaces or communicates with the global skills graph provider (e.g., LinkedIn) via one or more APIs and transmits the aggregated skills object metadata to the global skills graph provider. The global skills graph provider then maps the skills-related terms from the object metadata to one or more standardized skill tags within the global skills graph, where each standardized skill tag may include a skill identification (ID) that maps to various skills-related terms. Moreover, the standardized skill tags may also be cross-correlated with each other based on overlapping and/or similar skills-related data, thus generating lists of related standardized skill tags.

The skill-tag standardizer then imports the relevant standardized skill tags from the global skills graph and incorporates the standardized skill tags into the object metadata for the corresponding data objects within the property graph. In this manner, the present techniques enable the standardized skill-tagging of all the tenant-level data objects within the property graph according to a single, universal skills language that defines consistent, canonical representation of skills.

Furthermore, once the data objects within the property graph have been tagged with the standardized skill tags, the skills inference techniques described herein provide for the surfacing of highly-relevant, skills-related functionalities during the execution of a web-based application, such as an employee experience application. From the employee perspective, such skills-related functionalities may include, for example, skills-based search functionalities and/or skills-based recommendation functionalities. From the administrator/employer perspective, such skills-related functionalities may include, for example, standardized skills list functionalities and/or skills reporting functionalities. Moreover, such skills-related functionalities may be provided, at least in part, using AI-based techniques, either alone or in combination with user input.

In some embodiments, the skills inference techniques described herein are provided, at least in part, within the context of an employee experience application or platform, such as, for example, Microsoft® Viva®. In particular, the utilization of standardized skill tags across a wide variety of tenant resources and providers effectively provides a universal skills language that enables employees to seamlessly access skills-based tools and experiences within the context of a single, overarching employee experience application, thus solving the core problem of fragmentation within the skills management domain. In various embodiments, this feature enables the goal of the employee experience application (e.g., Microsoft® Viva®) to provide an experience layer that is tailored to the employee and that abstracts away the seams between disparate systems and tools.

It should be noted that the term "employee experience application" is used herein to refer to any suitable type of web-based application that provides relevant services to users associated with particular tenants. Thus, while Microsoft® Viva® is used as an example of a suitable employee experience application, those skilled in the art will appreciate that the present techniques are not limited to Microsoft® Viva®. Instead, the present techniques can be applied to a wide range of tenant-oriented applications that provide various functionalities to employees, administrators, managers, owners, and/or others associated with the tenant. Non-limiting examples of such functionalities include services relating to personal development, career advancement, job searching, job retention, networking, team hiring, onboarding, assignment planning/staffing, organization transformation, talent deployment, leadership hiring/succession planning, mergers and acquisitions, and the like.

Figure 3:
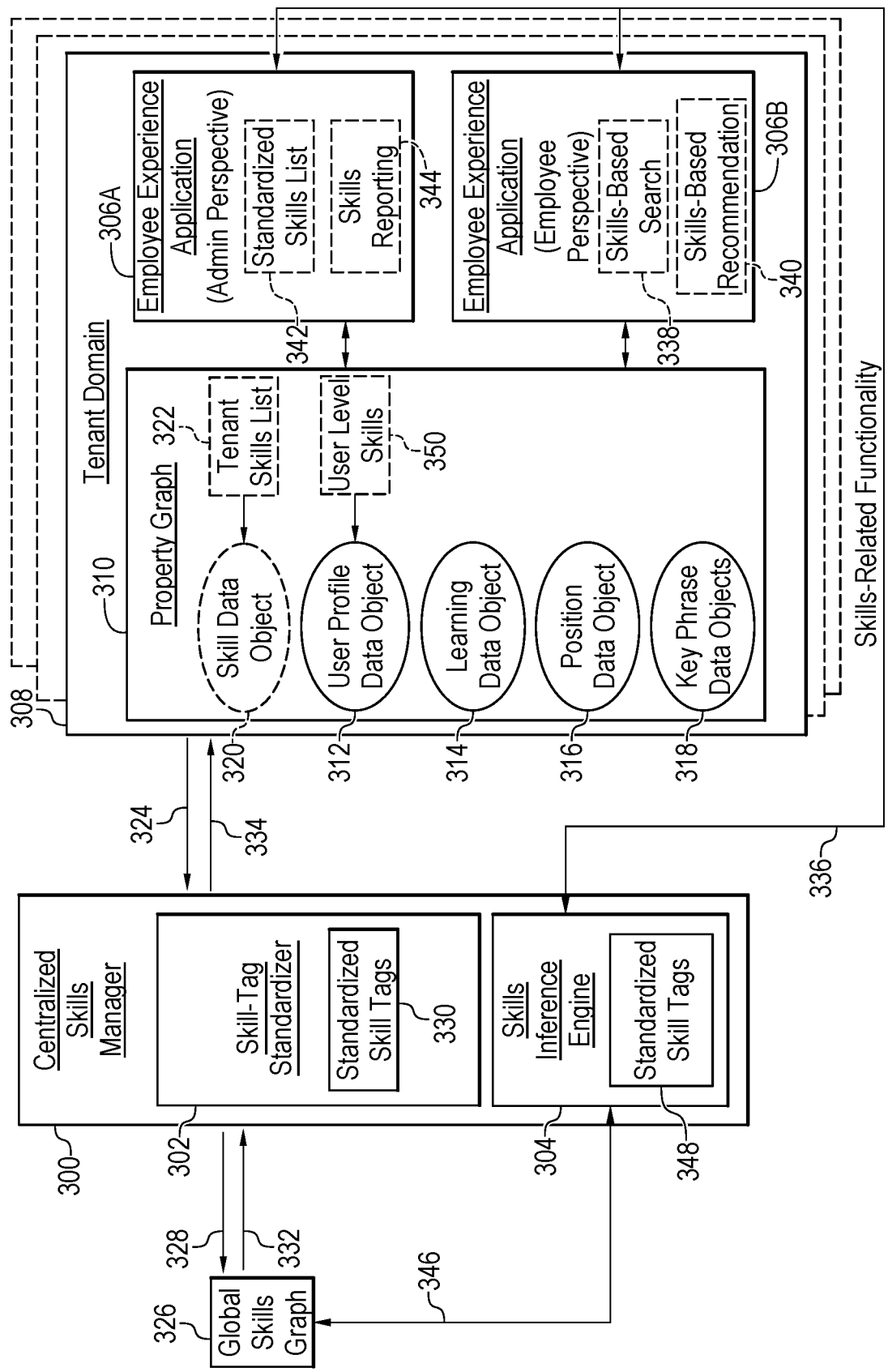
FIG. 3 is a schematic view depicting the manner in which the skills inference techniques described herein can be used to surface skills-related functionalities during the execution of an employee experience application according to embodiments described herein.

FIG. 3 is a schematic view depicting the manner in which the skills inference techniques described herein can be used to surface skills-related functionalities during the execution of an employee experience application according to embodiments described herein. More specifically, in various embodiments, such techniques are implemented using a centralized skills manager 300, which includes a skill-tag standardizer 302 and a skills inference engine 304. In some embodiments, the centralized skills manager 300 and corresponding skill-tag standardizer 302 and skills inference engine 304 are provided as program modules (e.g., a centralized skills management module and one or more corresponding sub-modules, including the skill-tag standardization sub-module and the skills inference sub-module described herein) located in one or more computer-readable storage media, as described further herein. Moreover, such program modules may be executed within the context of one or more computing systems, network environments, and/or distributed computing environments, as described further herein. As a non-limiting example, the centralized skills manager 300, the skill-tag standardizer 302, and the skills inference engine 304 may be executed by one or more processors corresponding to one or more centralized skills management servers that are operated by a centralized skills management provider. Furthermore, in some embodiments, the centralized skills management server(s) are the same as, integrated with, or otherwise associated with one or more employee experience application servers, which are configured to provide for execution of an employee experience application 306 within various tenant domains.

As shown in FIG. 3, the skill-tag standardizer 300 is configured to access data existing within a tenant domain 308 corresponding to a particular tenant, including an overarching property graph 310, such as Microsoft® Graph, that corresponds to the tenant. The property graph 310 includes tenant-level data objects, such as, for example, user profile data objects 312, learning data objects 314, position data objects 316, and key phrase data objects 318. Additional exemplary data objects that are not mentioned in FIG. 3 but can be accessed to be tagged include, but are not limited to, file data objects (e.g., extracted from Microsoft® Word®), calendar data objects (e.g., extracted from Microsoft® Outlook®), event data objects, task data objects, planning data objects, note data objects (e.g., extracted from Microsoft® OneNote®), group data objects (e.g., extracted from Microsoft 365® Groups, Yammer® Groups and/or Microsoft® Teams® team/channel data objects), job role data objects, onboarding path data objects, and topic data objects. Moreover, as additional data objects (and types of data objects) are accessed and tagged with standardized skill tags, richer employee experience scenarios can be provided for the user.

In addition, the property graph 310 may optionally include skill data objects 320, which may be based on one or more tenant skills lists 322 that have been generated and/or maintained at the tenant level. Specifically, in various embodiments, the tenant skills list(s) 322 include one or more tenant-specific skills libraries that are provided in a pre-defined format. The skill data objects 320 corresponding to the tenant skills lists 322 are then created within the property graph 310, enabling the tenant-specific skills to be tagged with one or more standardized skill tags.

In various embodiments, at least a portion of the data within the tenant domain 308 is retrieved from one or more existing HR systems (e.g., through corresponding APIs) and then imported into the property graph 310. In this manner, the skill-tag standardizer 302 is able to incorporate skills-related data, not only from various data sources corresponding to the tenant, but also from a large number of different providers that offer skills libraries/services (and/or other types of services) to the tenant.

In various embodiments, once the skill-tag standardizer 302 accesses the property graph 310, the skill-tag standardizer 302 aggregates and exports the object metadata corresponding to the data objects (e.g., the data objects 312, 314, 316, 318, and/or 320) within the property graph 310, as indicated by arrow 324. The skill-tag standardizer 302 then extracts skills-related terms from the object metadata.

The skill-tag standardizer 302 then interfaces with a global skills graph 326 that includes a dynamic, regularly-updated skills taxonomy, as described above with respect to the LinkedIn® Skills Graph, for example. More specifically, the skill-tag standardizer 302 interfaces or communicates with the global skills graph 326 via one or more skill finder APIs, as indicated by arrow 328. During such interfacing, the skill-tag standardizer 302 communicates the skills-related terms to the global skill graph provider, and the global skills graph provider returns a list of standardized skill tags 330 corresponding to the skills-related terms, as indicated by arrow 332. Moreover, in some embodiments, each standardized skill tag 330 within the list also includes one or more corresponding skill identifications (IDs), which are identifiable skill numbers for the standardized skill tag 330, and/or one or more skill aliases, which are related skill terms that provide for enhanced search capabilities with respect to the standardized skill tag 330.

In various embodiments, the skill-tag standardizer 302 then incorporates (or appends) the standardized skill tags 330 into the corresponding object metadata for the data objects (e.g., the data objects 312, 314, 316, 318, and/or 320) within the property graph 310, as indicated by arrow 334. In this manner, the data objects within the property graph 310 are skill-tagged according to a single, universal skills language. Furthermore, in various embodiments, the skill-tag standardizer 302 is further configured to continuously (or intermittently) repeat this process to skill-tag new (or modified) data objects within the property graph 310. In this manner, the standardized skill tags within the property graph 310 are continuously (or intermittently) updated, expanded, and maintained to account for the current skills market as evidenced from a wide variety of tenant resources and across any number of different providers.

Once the tenant-level data objects have been tagged (or stamped) with the standardized skill tags 330, the skills inference engine 304 of the centralized skills manager 300 utilizes the updated data objects to provide enhanced skills-related functionalities, as indicated by arrow 336. Such enhanced skills-related functionalities may be provided at the employee level (e.g., as viewed from the perspective of an employee) and/or the overall tenant level (e.g., as viewed from the perspective of an admin, manager, or the like). As non-limiting examples, the skills inference engine 304 may utilize the data objects (e.g., the data objects 312, 314, 316, 318, and/or 320) with the incorporated standardized skill tags 330 to provide a skills-based search functionality 338 and/or a skills-based recommendation functionality 340 to an employee during execution of the employee experience application 304B on the employee's computing system. As other non-limiting examples, the skills inference engine 304 may utilize the data objects (e.g., the data objects 312, 314, 316, 318, and/or 320) with the incorporated standardized skill tags 330 to provide a standardized skills list functionality 342 and/or a skills reporting functionality 344 to an admin/manager during execution of the employee experience application 304A on the admin/manager's computing system.

In various embodiments, the skills inference engine 304 is configured to extract AI-inferred and/or user-input skills-related terms associated with the execution of the web-based application 306. In addition, in some embodiments, the skills inference engine 304 is configured to automatically infer secondary skills-related terms that are related to the extracted skills-related terms.

The skills inference engine 304 then interfaces with the global skills graph 326 via a skills finder API, as indicated by arrow 346. During such interfacing, the skills inference engine 304 may send the extracted skills-related terms to the global skills graph provider, and the global skills graph provider may return a list of standardized skill tags 348 that relate to the extracted skills-related terms. The skills inference engine 304 may then access the property graph 310 and extract a portion of the data objects (e.g., any of the data objects 312, 314, 316, 318, and/or 320) that include object metadata with incorporated skill tags that match the list of standardized skill tags 348 relating to the extracted skills-related terms. The skills inference engine 304 then utilizes such data objects to provide one or more skills-related functionalities (e.g., any of the functionalities 338, 340, 342, and/or 344) during the execution of the employee experience application 306. For example, the skills inference engine 304 may utilize such data objects to surface richer search and recommendation results on the display of the user's computing system.

In some embodiments, the skills inference engine 334 is also configured to automatically infer user-level skills 350 based on skill-tagged data objects corresponding to each user. Such inferred user-level skills 350 may then be validated by the corresponding users and/or one or more third parties. The validated user-level skills 350 may then be incorporated into the corresponding user profiles. In this manner, the user profiles within the tenant domain 308 by be automatically (or semi-automatically) and continuously updated to reflect the most up-to-date skills possessed by the users associated with the tenant.

Furthermore, those skilled in the art will appreciate that the implementation of the skill-tag standardizer 300 shown in FIG. 3 is for illustrative purposes only, and the exact implementation of the skills inference techniques described herein may vary depending on the details of the particular implementation. For example, in some embodiments, the centralized skills manager 300, the skill-tag standardizer 302, and the skills inference engine 304 are provided by a web-based employee experience application provider. In such embodiments, the standardized skill tags provided by the global skills graph 326 are directly utilized by the employee experience application provider to surface enhanced skills-based employee experiences during execution of the web-based employee experience application on various remote computing systems.

The following is a description of several exemplary implementations of the skills inference techniques described herein for particular use-case scenarios. Those skilled in the art will appreciate that these exemplary implementations are for illustrative purposes only. In practice, the skills inference techniques described herein may be implemented in any other suitable manner to achieve any other suitable results, depending on the details of the particular implementation.

FIG. 4 is a schematic view of a user interface 400 including standardized skill tags 402 listed on a user profile 404 according to embodiments described herein. More specifically, the user profile 504 shown in FIG. 4 includes a list of skills (e.g., "threat modeling," "data loss prevention," "security assessment," "digital forensics," and "executive communication") that have been identified as being possessed by John Doe, who is an information security analyst associated with a particular tenant. According to embodiments described herein, such list of skills is identified, at least in part, by extracting skills-related terms associated with the execution of the employee experience application on John Doe's computing system, interfacing with the global skills graph to determine one or more standardized skill tags corresponding to the extracted skills-related terms, and then identifying skill data objects within the property graph that include incorporated standardized skill tags that match (or relate to) the standardized skill tags corresponding to the extracted skills-related terms.

Figure 5:
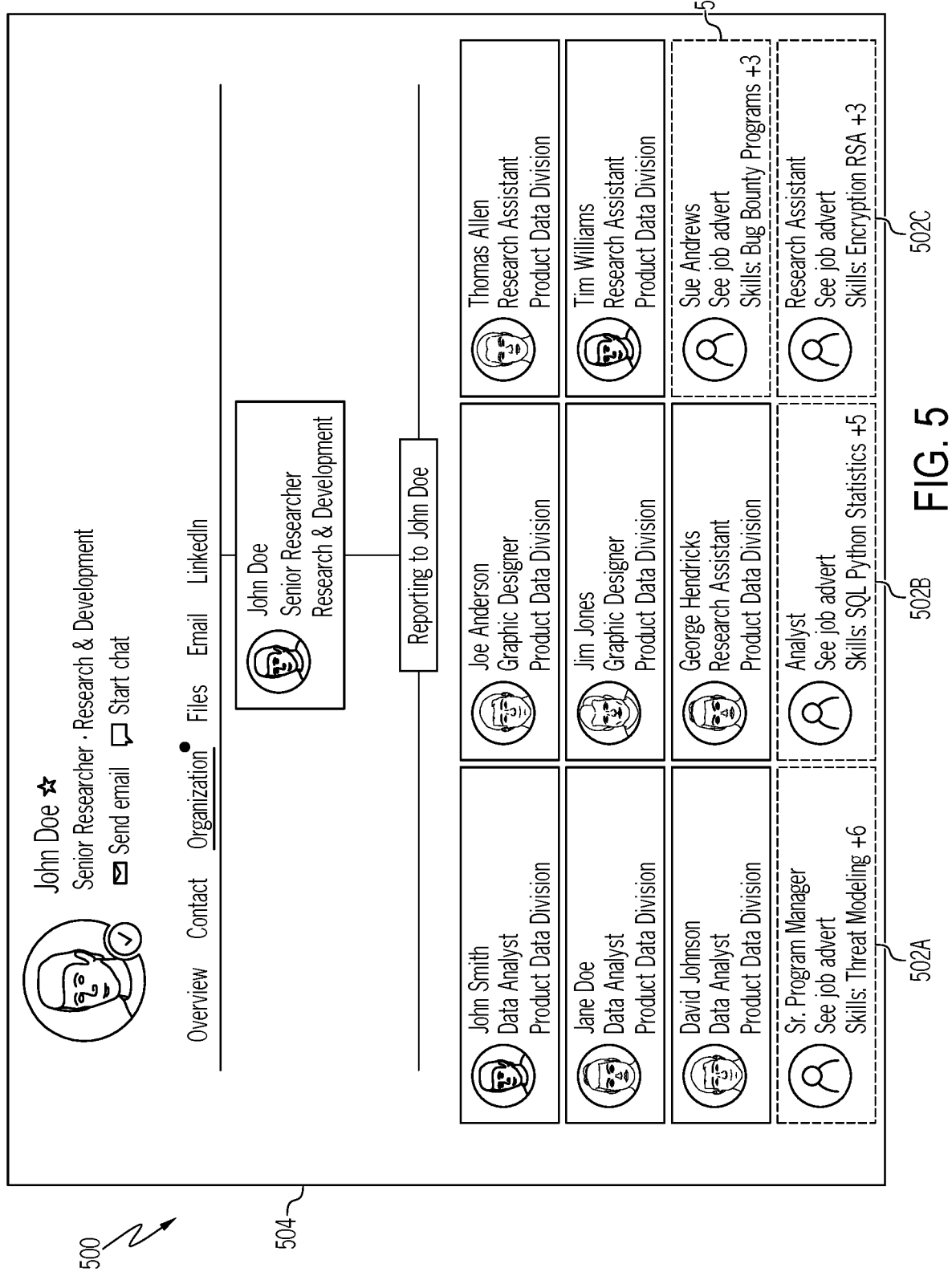
FIG. 5 is a schematic view of a user interface including open job positions listed under a user account according to embodiments described herein.

FIG. 5 is a schematic view of a user interface 500 including open job positions 502A-D listed under a user account 504 according to embodiments described herein. More specifically, in this embodiment, an "Organization" tab under the user's (John Doe's) account 504 lists a number of employees who report to John Doe. In addition, the "Organization" tab lists open (or suggested) job positions 502A-D that are recommended for John Doe's team, as well as the skills relating to each job position. Such job positions 502A-D may be identified, at least in part, by extracting skills-related terms associated with the execution of the employee experience application on John Doe's computing system, interfacing with the global skills graph to determine one or more standardized skill tags corresponding to the extracted skills-related terms, and then identifying position data objects within the property graph that include incorporated standardized skill tags that match (or relate to) the standardized skill tags corresponding to the extracted skills-related terms.

Figure 6:
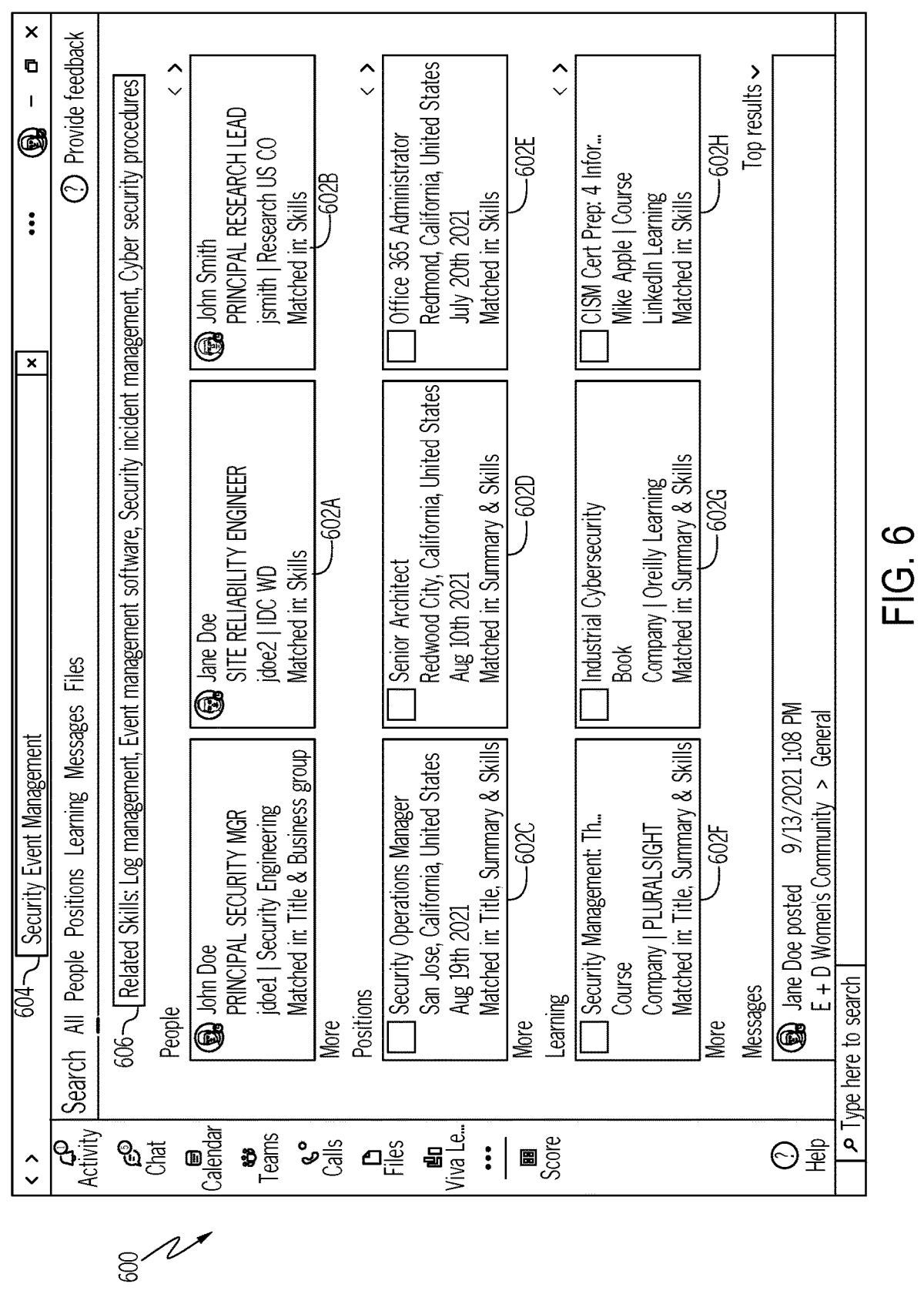

FIG. 6 is a schematic view of a user interface 600 including skills-related search results 602A-G according to embodiments described herein. In particular, the user interface 600 includes a search bar 604. According to the embodiment shown in FIG. 6, the search terms "security event management" have been input into the search bar 604. In response, the user interface 600 surfaces a related skills bar 606 including a list of standardized skills that match (or relate to) the search terms. In addition, the user interface 600 surfaces a number of skills-based search results, including suggested people 602A and 602B, suggested positions 602C, 602D, and 602E, and suggested learning opportunities 602F, 602G, and 602H. In various embodiments, such skills-based search results may be identified, at least in part, by extracting skills-related terms from the search terms, interfacing with the global skills graph to determine one or more standardized skill tags corresponding to the extracted skills-related terms, and then identifying user profile/people data objects, position data objects, and learning data objects, for example, within the property graph that include incorporated standardized skill tags that match (or relate to) the standardized skill tags corresponding to the extracted skills-related terms. In this manner, the skills inference techniques described herein enable the entire property graph to be quickly and efficiently searched to identify all data objects that relate to the skills corresponding to the search terms.

FIG. 7 is a schematic view of a user interface 700 including skills-based recommendations 702 according to embodiments described herein. In this embodiment, the user interface 700 surfaces the skills-based recommendations 702 based on the user's interactions with respect to the property graph during the execution of the corresponding web-based application. Such interactions may include, for example, accessing or creating particular files within the property graph. Such interactions may also include viewing, editing, or modifying the user's information as provided within the corresponding user profile. In general, skills-related terms can be extracted from any user input or other user interaction during the execution of the web-based application, and such skills-related terms can then be used to identify user recommendations based on data objects within the property graph that relate to similar skills, as described herein.

Figure 8:
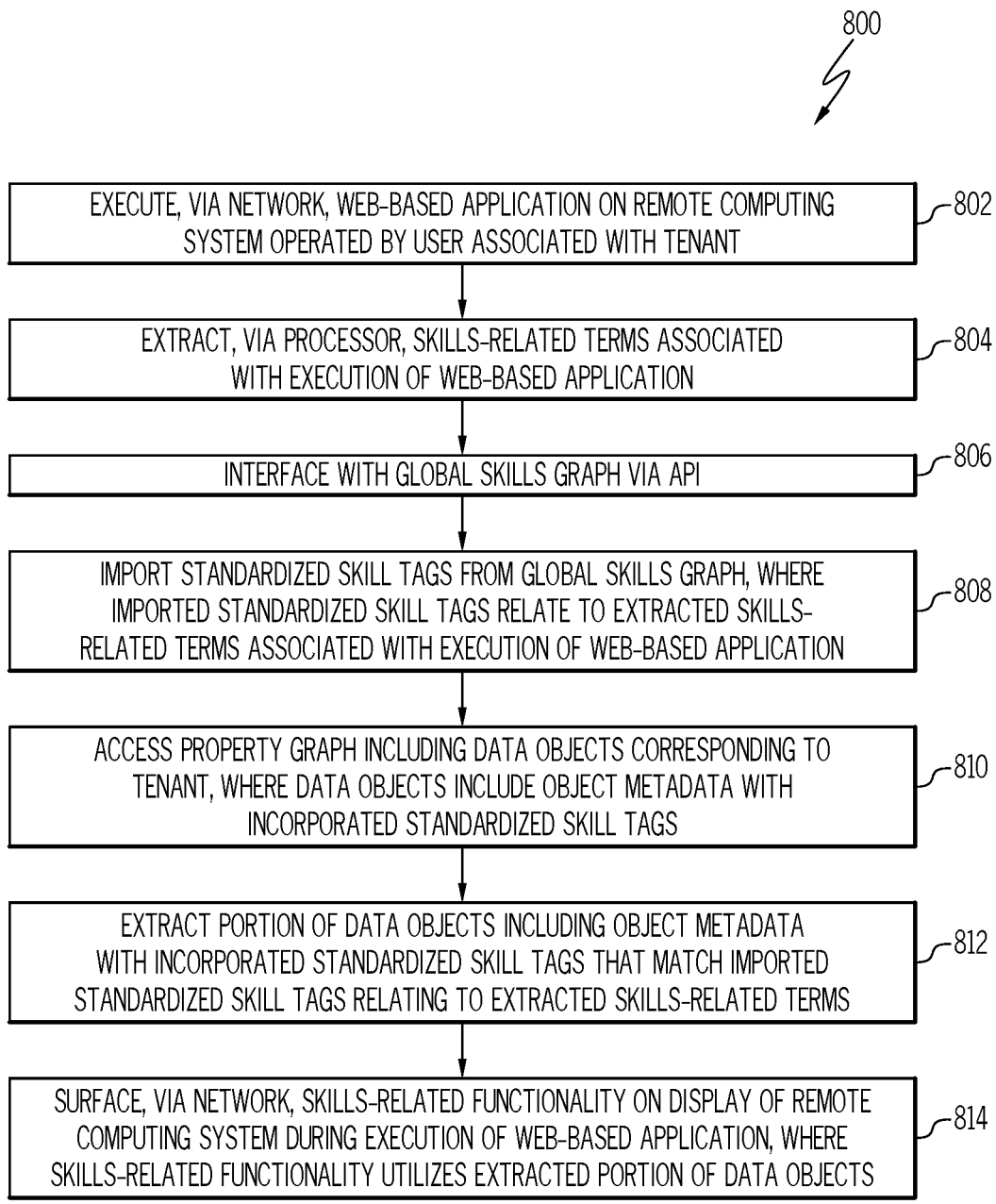
FIG. 8 is a process flow diagram of a method for skills inference within the context of a global skills graph and a tenant-specific property graph according to embodiments described herein.

FIG. 8 is a process flow diagram of a method 800 for skills inference within the context of a global skills graph and a tenant-specific property graph according to embodiments described herein. The method 800 is executed via one or more computing systems, such as the exemplary computing system described with respect to FIG. 9. The computing system(s) include one or more processors and one or more computer-readable storage media including computer-executable instructions that, when executed by the processor(s), cause the processor(s) to perform the blocks of the method 800. An exemplary embodiment of such computer-readable storage media is described with respect to FIG. 11. Moreover, in various embodiments, the method 800 is executed within the context of a network environment including one or more centralized skills management system(s)/server(s), as described further with respect to the exemplary network environment of FIG. 10.

The method 800 begins at block 802, at which a web-based application is executed on a remote computing system operated by a user associated with a tenant. For example, in various embodiments, the web-based application is an employee experience application, and the user operating the remote computing system is an employee, manager, administrator, or the like associated with a particular organization.

At block 804, skills-related terms associated with the execution of the web-based application are extracted. In various embodiments, such extraction is accomplished using AI-based techniques. At block 806, an API is used to interface with a global skills graph. At block 808, standardized skill tags are imported from the global skills graph, where the imported standardized skill tags relate to the extracted skills-related terms associated with the execution of the web-based application.

In some embodiments, the extraction of the skills-related terms at block 804 includes automatically inferring secondary skills-related terms that are related to the extracted skills-related terms, and at least a portion of the imported standardized skill tags from block 808 relate to the secondary skills-related terms. Additionally or alternatively, in some embodiments, the extraction of the skills-related terms at block 804 includes receiving a user input including one or more search terms and automatically inferring one or more skills-related terms corresponding to the search term(s). Additionally or alternatively, in some embodiments, the extraction of the skills-related terms at block 804 includes receiving a user-initiated update and/or an AI-driven update to a user profile corresponding to the user and automatically inferring skills-related terms corresponding to the user-initiated and/or AI-driven update. Additionally or alternatively, in some embodiments, the extraction of the skills-related terms at block 804 includes receiving a third-party input during the execution of the web-based application and automatically inferring skills-related terms corresponding to the third-party input. Additionally or alternatively, in some embodiments, the extraction of the skills-related terms at block 804 includes automatically extracting skills-related terms from a file that is accessed by the user. Additionally or alternatively, in some embodiments, the extraction of the skills-related terms at block 804 includes automatically extracting skills-related terms from one or more emails and/or one or more chat-based messages that are sent and/or received by the user.

At block 810, a property graph including data objects corresponding to the tenant is accessed. The data objects include object metadata with incorporated standardized skill tags. In various embodiments, such standardized skill tags have been incorporated into the object metadata via the skill-tag standardization process described herein (e.g., as described with respect to FIG. 3, for example).

At block 812, a portion of the data objects are extracted from the property graph, where the extracted data objects include object metadata with incorporated standardized skill tags that match the imported standardized skill tags relating to the extracted skills-related terms. In various embodiments, such extraction is accomplished using AI-based techniques. Moreover, in various embodiments, the incorporated standardized skill tags that match the imported standardized skill tags include identical standardized skill tags and/or related standardized skill tags, as determined by interfacing with the global skills graph via the API.

At block 814, one or more skills-related functionalities are surfaced on the display of the remote computing system during the execution of the web-based application, where such skills-related functionalities utilize the extracted data objects. The skills-related functionalities may include, for example, a skills-based recommendation functionality, a skills-based search functionality, a skills-based user profile update functionality, a tenant skills list standardization functionality, and/or a skills-based reporting functionality. As an example, for embodiments relating to a skills-based search functionality, such functionality may provide the extracted data objects as search results since such data objects have been identified as relating to the same (or similar) standardized skill tags as the search terms that were input by the user.

The block diagram of FIG. 8 is not intended to indicate that the blocks of the method 800 are to be executed in any particular order, or that all of the blocks of the method 800 are to be included in every case. Moreover, any number of additional blocks may be included within the method 800, depending on the details of the specific implementation.

Figure 9:
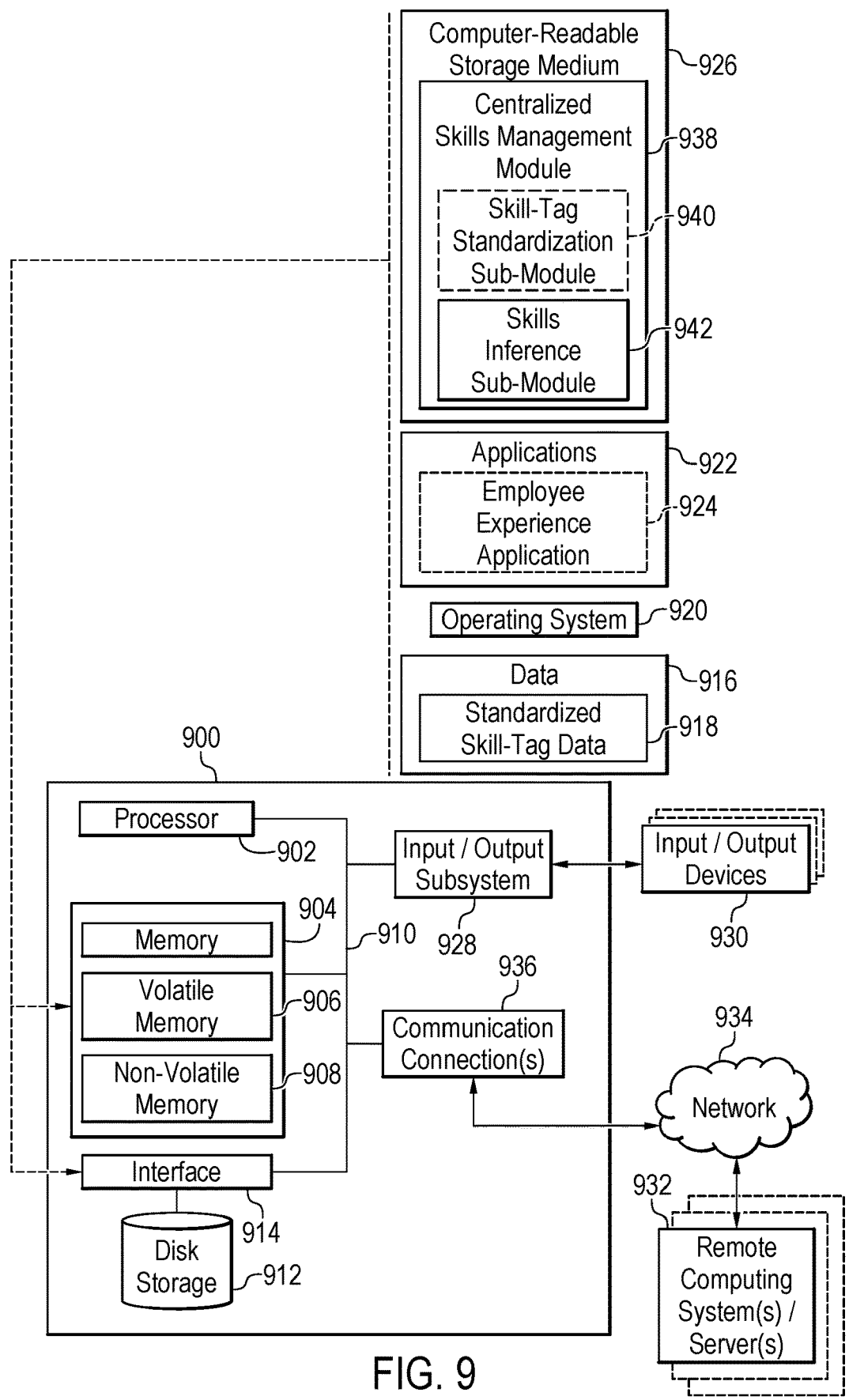
FIG. 9 is a block diagram of an exemplary computing system for implementing the skills inference techniques described herein.

FIG. 9 is a block diagram of an exemplary computing system 900 for implementing the skills inference techniques described herein. The exemplary computing system 900 includes a processor 902 and a memory 904. The processor 902 may include any suitable type of processing unit or device, such as, for example, a single-core processor, a multi-core processor, a computing cluster, or any number of other configurations. Moreover, the processor 902 may include an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combinations thereof, designed to perform the functions described herein.

The memory 904 typically (but not always) includes both volatile memory 906 and non-volatile memory 908. The volatile memory 906 retains or stores information so long as the memory is supplied with power. By contrast, the non-volatile memory 908 is capable of storing (or persisting) information even when a power supply is not available. The volatile memory 906 may include, for example, RAM (e.g., synchronous RAM (SRAM), dynamic RAM (DRAM), synchronous dynamic RAM (SDRAM), and the like) and CPU cache memory. The nonvolatile memory 908 may include, for example, read-only memory (ROM) (e.g., programmable ROM (PROM), electrically programmable ROM (EPROM), electrically erasable ROM (EEROM) or the like), flash memory, nonvolatile random-access memory (RAM), solid-state memory devices, memory storage devices, and/or memory cards.

The processor 902 and the memory 904, as well as other components of the computing system 900, are interconnected by way of a system bus 910. The system bus 910 can be implemented using any suitable bus architecture known to those skilled in the art.

According to the embodiment shown in FIG. 9, the computing system 900 also includes a disk storage 912. The disk storage 912 may include any suitable removable/non-removable, volatile/non-volatile storage component or device. For example, the disk storage 912 may include, but is not limited to, a magnetic disk drive, floppy disk drive, tape drive, Jaz drive, Zip drive, LS-210 drive, flash memory card, memory stick, or the like. In addition, the disk storage 912 may include storage media separately from (or in combination with) other storage media including, but not limited to, an optical disk drive, such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 912 to the system bus 910, a removable or non-removable interface is typically used, such as interface 914 shown in FIG. 9.

In various embodiments, the disk storage 912 and/or the memory 904 function as one or more databases that are used to store data 916 relating to the techniques described herein. Such data 916 include, but are not limited to, standardized skill-tag data 918 generated according to embodiments described herein.

Those skilled in the art will appreciate that FIG. 9 describes software that acts as an intermediary between a user of the computing system 900 and the basic computing resources described with respect to the operating environment of the computing system 900. Such software includes an operating system 920. The operating system 920, which may be stored on the disk storage 912, acts to control and allocate the computing resources of the computing system 900. Moreover, system applications 922, including, for example, the employee experience application (or other web-based application) 924 described herein, take advantage of the management of the computing resources by the operating system 920 through one or more program modules stored within a computer-readable storage medium (or media) 926, as described further herein.

The computing system 900 also includes an input/output (I/O) subsystem 928. The I/O subsystem 928 includes a set of hardware, software, and/or firmware components that enable or facilitate inter-communication between the user of the computing system 900 and the processor 902 of the computing system 900. During operation of the computing system 900, the I/O subsystem 928 enables the user to interact with the computing system 900 through one or more I/O devices 930. Such I/O devices 930 may include any number of input devices or channels, such as, for example, one or more touchscreen/haptic input devices, one or more buttons, one or more pointing devices, one or more accessories, one or more audio input devices, and/or one or more video input devices, such as a camera. Furthermore, in some embodiments the one or more input devices or channels connect to the processor 902 through the system bus 910 via one or more interface ports (not shown) integrated within the I/O subsystem 928. Such interface ports may include, for example, a serial port, a parallel port, a game port, and/or a universal serial bus (USB).

In addition, such I/O devices 930 may include any number of output devices or channels, such as, for example, one or more audio output devices, one or more haptic feedback devices, and/or one or more display devices. Such output devices or channels may use some of the same types of ports as the input devices or channels. Thus, for example, a USB port may be used to both provide input to the computing system 900 and to output information from the computing system 900 to a corresponding output device. Moreover, in some embodiments, the one or more output devices or channels are accessible via one or more adapters (not shown) integrated within the I/O subsystem 928.

In various embodiments, the computing system 900 is communicably coupled to any number of remote computing systems/servers 932. The remote computing system(s)/server(s) 932 may include, for example, one or more personal computers, one or more servers, one or more routers, one or more network PCs, one or more workstations, one or more microprocessor-based appliances, one or more mobile phones, and/or one or more peer devices or other common network nodes. As an example, in some embodiments, the computing system 900 is a centralized skills management server hosting the employee experience application 924 in a networked environment using logical connections to the remote computing systems/servers 932. In such embodiments, the computing system 900 may provide for execution of the employee experience application 924 on the remote computing systems/servers 932 with the enhanced functionality provided by the skills inference techniques described herein. As another example, in some embodiments, the computing system 900 is the centralized skills management server, and at least a portion of the remote computing systems/servers 932 include one or more global skills graph servers and/or one or more property graph servers that are accessed by the centralized skills management server during execution of the skills inference techniques described herein, as described further with respect to FIG. 10.

In various embodiments, the remote computing systems/servers 932 are logically connected to the computing system 900 through a network 934 and then connected via a communication connection 936, which may be wireless. The network 934 encompasses wireless communication networks, such as local-area networks (LAN) and wide-area networks (WAN). LAN technologies include Fiber Distributed Data Interface (FDDI), Copper Distributed Data Interface (CDDI), Ethernet, Token Ring, and the like. WAN technologies include, but are not limited to, point-to-point links, circuit switching networks like Integrated Services Digital Networks (ISDN) and variations thereon, packet switching networks, and Digital Subscriber Lines (DSL).

The communication connection 936 includes the hardware/software employed to connect the network 934 to the bus 910. While the communication connection 936 is shown for illustrative clarity as residing inside the computing system 900, it can also be external to the computing system 900. The hardware/software for connection to the network 934 may include, for example, internal and external technologies, such as mobile phone switches, modems including regular telephone grade modems, cable modems and DSL modems, ISDN adapters, and/or Ethernet cards.

As described above, system applications, such as the employee experience application 924, take advantage of the management of the computing resources by the operating system 920 through one or more program modules stored within the computer-readable storage medium (or media) 926. In some embodiments, the computer-readable storage medium 926 is integral to the computing system 900, in which case it may form part of the memory 904 and/or the disk storage 912. In other embodiments, the computer-readable storage medium 926 is an external device that is connected to the computing system 900 when in use.

In various embodiments, the one or more program modules stored within the computer-readable storage medium 926 include program instructions or code that may be executed by the processor 902 to perform various operations. In various embodiments, such program modules include, but are not limited to, a centralized skills management module 938 that includes any number of sub-modules for performing centralized skills management techniques. In particular, the centralized skills management module 938 includes an optional skill-tag standardization sub-module 940, as well as a skills inference module 942 that causes the processor 902 to perform operations that result in the execution of the skills inference techniques provided herein, as described with respect to the method 800 of FIG. 8, for example. Furthermore, in various embodiments, execution of the employee experience application 924 in conjunction with the centralized skills management module 938 results in the surfacing of any number of enhanced skills-related functionalities during execution of the employee experience application 924 on the remote computing systems/servers 932.

It is to be understood that the block diagram of FIG. 9 is not intended to indicate that the computing system 900 is to include all of the components shown in FIG. 9. Rather, the computing system 900 can include fewer or additional components not illustrated in FIG. 9 (e.g., additional applications, additional modules, additional memory devices, additional network interfaces, etc.). Furthermore, any of the functionalities of the one or more program modules/sub-modules may be partially, or entirely, implemented in hardware and/or in the processor 902. For example, the functionality may be implemented with an application specific integrated circuit, in logic implemented in the processor 902, or in any other device.

Figure 10:
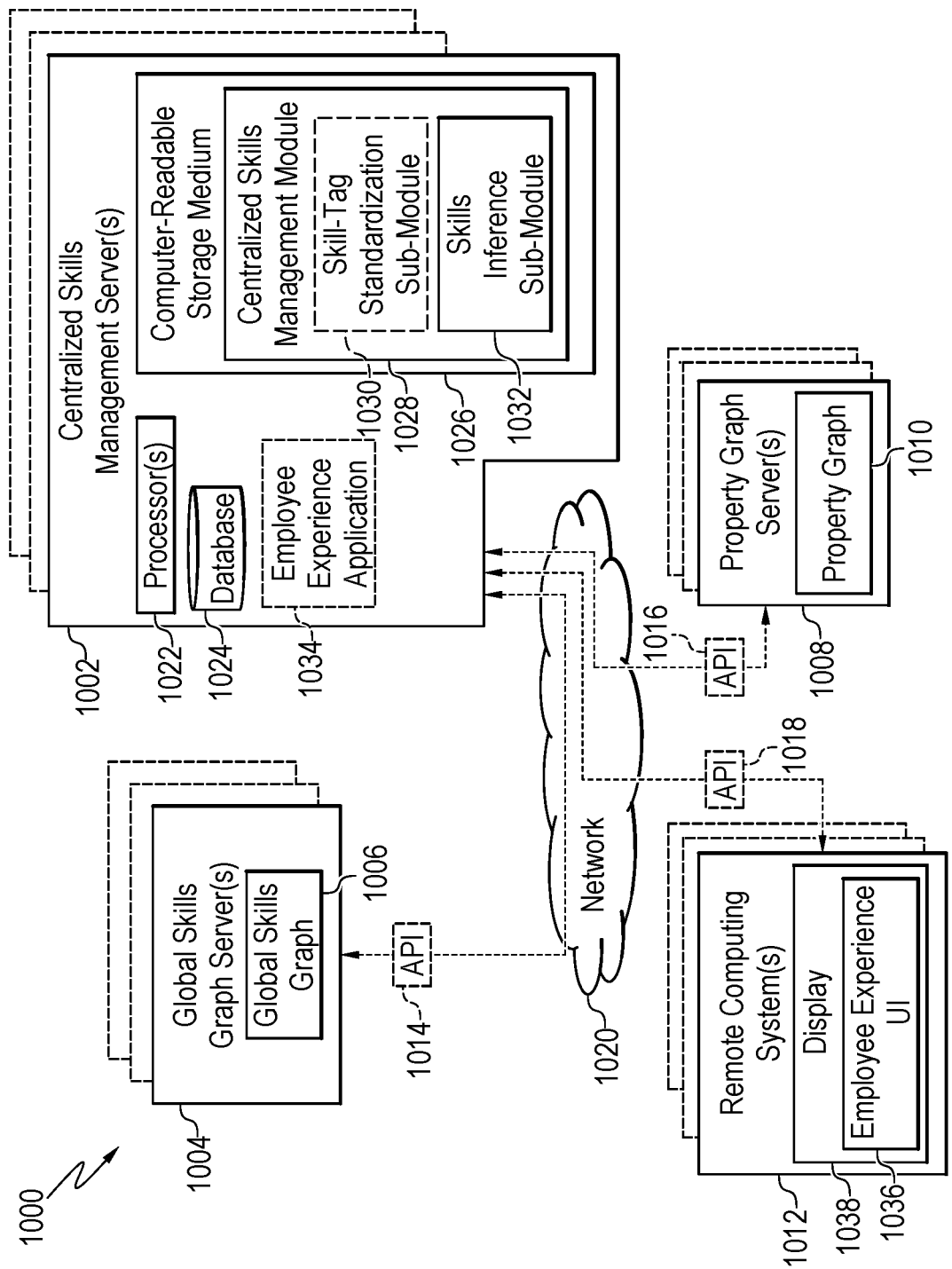
FIG. 10 is a block diagram of an exemplary network environment for implementing the skills inference techniques described herein.

FIG. 10 is a block diagram of an exemplary network environment 1000 for implementing the skills inference techniques described herein. As shown in FIG. 10, the network environment 1000 includes one or more centralized skills management server(s) 1002 that provide for the execution of the skills inference techniques described herein. In addition, the network environment 1000 may include one or more global skills graph servers 1004 including skills-related data that are arranged and maintained in the form of a global skills graph 1006 and one or more property graph servers 1008 including various types of data objects (e.g., tenant-level data objects) that are arranged and maintained in the form of a property graph 1010. Furthermore, the network environment 1000 may include any number of remote computing systems 1012. In various embodiments, the remote computing systems 1012 include tenant-specific computing systems 1012 that are operated by one or more admins, managers, employees, and the like corresponding to particular tenants (e.g., organizations).

In various embodiments, the centralized skills management server(s) 1002 are configured to communicate with the global skills graph server(s) 1004, the property graph server(s) 1008, and the remote computing system(s) 1012 via corresponding application programming interfaces (APIs) 1014, 1016, and 1018, respectively, provided through a network 1020. The network 1020 may include, but is not limited to, a cellular network, a point-to-point dial up connection, a satellite network, the Internet, a local area network (LAN), a wide area network (WAN), and/or a Wi-Fi network. Such networks are widely used to connect various types of network elements, such as routers, servers, and gateways. Moreover, those skilled in the art will appreciate that the present techniques may also be practiced in a multi-network environment having various connected public and/or private networks. Furthermore, those skilled in the art will appreciate that communication networks can take several different forms and use several different communication protocols. For example, in some embodiments, the present techniques may be practiced in a distributed computing environment in which tasks are performed by remote processing devices that are linked through a communications network. In a distributed computing environment, program modules can be located in both local and remote computer-readable storage media.

In various embodiments, the centralized skills management server(s) 1002 include one or more processors 1022, a database 1024 that functions as a repository for the standardized skill-tag data generated according to embodiments described herein, and a computer-readable storage medium 1026 including a centralized skills management module 1028 and corresponding skill-tag standardization and skills inference sub-modules 1030 and 1032, as described herein. In various embodiments, the optional skill-tag standardization sub-module 1030 and the skills inference sub-module 1032 each direct the processor(s) 1022 to interface with or access the global skills graph 1006 and the property graph 1010 via the corresponding APIs 1014 and 1016, thus enabling the implementation of the techniques described herein.

In some embodiments, the centralized skills management server(s) 1002 also include code corresponding to a web-based employee experience application (or other suitable type of web-based application) 1034. In such embodiments, the centralized skills management server(s) 1002 may host the web-based employee experience application 1034 on the remote computing system(s) 1012 via the corresponding API 1018. In particular, the centralized skills management server(s) 1002 may provide for execution of the employee experience application 1034 on the remote computing systems 1012 by surfacing an employee experience user interface 1036 on a display 1038 corresponding to each remote computing system 1012. Furthermore, in various embodiments, the data objects with incorporated standardized skill tags, which may be generated via execution of the skill-tag standardization sub-module 1030, are used to surface one or more skills-related functionalities with respect to the employee experience user interface 1036 via execution of the skills inference sub-module 1032.

It is to be understood that the block diagram of FIG. 10 is not intended to indicate that the network environment 1000 is to include all of the components shown in FIG. 10. Rather, the network environment 1000 can include fewer or additional components not illustrated in FIG. 10. For example, in practice, the centralized skills management sever(s) 1002 will include a number of additional components not depicted in the simplified block diagram of FIG. 10, as described with respect to the computing system 900 of FIG. 9, for example. Moreover, in some embodiments, the centralized skills management sever(s) 1002, the global skills graph server(s) 1004, and/or the property graph server(s) 1008 may be combined into a single server (or series of servers). Furthermore, in some embodiments, the employee experience application 1014 may be provided by one or more separate employee experience application servers (not shown), rather than being combined with the centralized skills management server(s) 1002.

Figure 11:
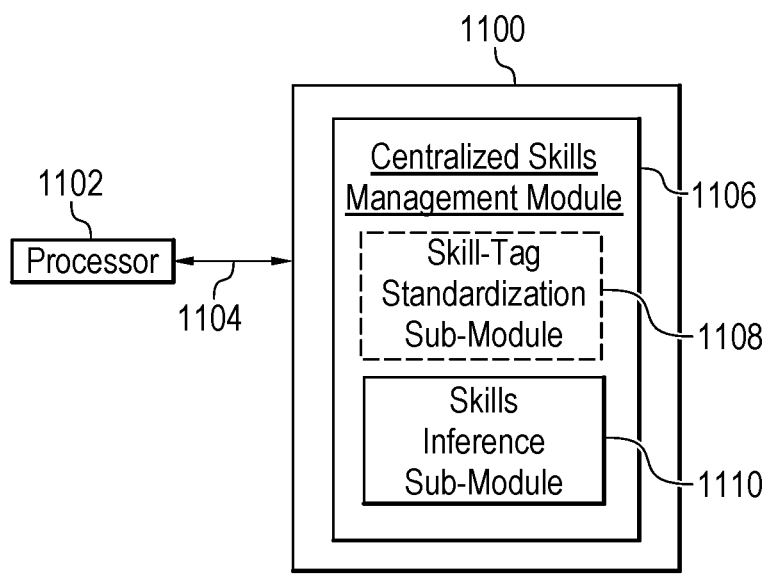
FIG. 11 is a block diagram of an exemplary computer-readable storage medium for implementing the skills inference techniques described herein.

FIG. 11 is a block diagram of an exemplary computer-readable storage medium 1100 for implementing the skills inference techniques described herein. In various embodiments, the computer-readable storage medium 1100 is accessed by a processor 1102 over a computer interconnect 1104. For example, in some embodiments, the computer-readable storage medium 1100 is the same as, or similar to, the computer-readable storage medium described with respect to the computing system 900 of FIG. 9 and/or the network environment 1000 of FIG. 10.

In various embodiments, the computer-readable storage medium 1100 includes code (i.e., computer-executable instructions) to direct the processor 1102 to perform the operations of the present techniques. Such code may be stored within the computer-readable storage medium 1100 in the form of program modules, where each module includes a set of computer-executable instructions that, when executed by the processor 1102, cause the processor 1102 to perform a corresponding set of operations. In particular, in various embodiments, the computer-readable storage medium 1100 includes a centralized skills management module 1106 that directs the processor 1102 to perform centralized skills management techniques, as described herein. Moreover, in various embodiments, the centralized skills management module 1106 accomplishes this via one or more sub-modules. Such sub-modules may include an optional skill-tag standardization sub-module 1108 that directs the processor 1102 to modify data objects within the tenant-specific property graph such that the corresponding object metadata include standardized skill tags, thus providing a single, universal skills language across all tenant-level data sources and providers. Furthermore, such sub-modules include a skills inference sub-module 1110 that directs the processor 1102 to perform the skills inference techniques described herein (or any suitable variation thereof) to provide one or more skills-related functionalities during the execution of a web-based application. Such skills inference techniques include, but are not limited to, the method 800 described with respect to FIG. 8.

Moreover, those skilled in the art will appreciate that any suitable number of the modules/sub-modules shown in FIG. 11 may be included within the computer-readable storage medium 1100. Furthermore, any number of additional modules/sub-modules not shown in FIG. 11 may be included within the computer-readable storage medium 1100, depending on the details of the specific implementation.

It should be noted that, while the methods and processes described herein are generally expressed in regard to discrete steps, these steps should be viewed as being logical in nature and may or may not correspond to any specific actual and/or discrete steps of a given implementation. In addition, the order in which these steps are presented in the various methods and processes, unless otherwise indicated, should not be construed as the only order in which the steps may be carried out. Moreover, in some instances, some of these steps may be combined and/or omitted. Those skilled in the art will recognize that the logical presentation of steps is sufficiently instructive to carry out aspects of the claimed subject matter irrespective of any particular development or coding language in which the logical instructions/steps are encoded.

Of course, while the methods and processes described herein include various novel features of the disclosed subject matter, other steps (not listed) may also be carried out in the execution of the subject matter set forth in these methods and processes. Those skilled in the art will appreciate that the logical steps of these methods and processes may be combined together or split into additional steps. Steps of the above-described methods and processes may be carried out in parallel or in series. Often, but not exclusively, the functionality of a particular method or process is embodied in software (e.g., applications, system services, libraries, and the like) that is executed on one or more processors of computing systems. Additionally, in various embodiments, all or some of the various methods and processes may also be embodied in executable hardware modules including, but not limited to, system on chips (SoC's), codecs, specially designed processors and/or logic circuits, and the like, on a computing system.

As suggested above, each method or process described herein is typically embodied within computer-executable instruction (or code) modules including individual routines, functions, looping structures, selectors and switches (such as if-then and if-then-else statements), assignments, arithmetic computations, and the like, that, in execution, configure a computing system to operate in accordance with the particular method or process However, as suggested above, the exact implementation in executable statement of each of the methods or processes is based on various implementation configurations and decisions, including programming languages, compilers, target processors, operating environments, and the linking or binding operation. Those skilled in the art will readily appreciate that the logical steps identified in these methods and processes may be implemented in any number of ways and, thus, the logical descriptions set forth above are sufficiently enabling to achieve similar results.

While various novel aspects of the disclosed subject matter have been described, it should be appreciated that these aspects are exemplary and should not be construed as limiting. Variations and alterations to the various aspects may be made without departing from the scope of the disclosed subject matter.

Examples

Example 1 is a method for skills inference within the context of a global skills graph. The method is implemented in a computing system including a processor. The method includes executing, via a network, a web-based application on a remote computing system operated by a user associated with a tenant and extracting, via the processor, skills-related terms associated with the execution of the web-based application. The method includes interfacing with a global skills graph via an API and importing standardized skill tags from the global skills graph, where the imported standardized skill tags relate to the extracted skills-related terms associated with the execution of the web-based application. The method also includes accessing a property graph including data objects corresponding to the tenant, where the data objects include object metadata with incorporated standardized skill tags. The method further includes extracting a portion of the data objects including object metadata with incorporated standardized skill tags that match the imported standardized skill tags relating to the extracted skills-related terms, as well as surfacing, via the network, a skills-related functionality on the display of the remote computing system during the execution of the web-based application, where the skills-related functionality utilizes the extracted portion of the data objects.

Example 2 includes the method of example 1, including or excluding optional features. In this example, extracting the skills-related terms associated with the execution of the web-based application further includes automatically inferring secondary skills-related terms that are related to the extracted skills-related terms. In addition, in this example, at least a portion of the imported standardized skill tags relate to the secondary skills-related terms.

Example 3 includes the method of example 1 or 2, including or excluding optional features. In this example, the skills-related functionality includes a skills-based recommendation functionality, a skills-based search functionality, a skills-based user profile update functionality, a tenant skills list standardization functionality, a skills-based reporting functionality, or some combination thereof.

Example 4 includes the method of any one of examples 1 to 3, including or excluding optional features. In this example, extracting the skills-related terms associated with the execution of the web-based application includes receiving a user input including one or more search terms and automatically inferring skills-related terms corresponding to the search term(s).

Example 5 includes the method of any one of examples 1 to 4, including or excluding optional features. In this example, extracting the skills-related terms associated with the execution of the web-based application includes receiving a user-initiated update or an AI-driven update to a user profile corresponding to the user and automatically inferring skills-related terms corresponding to the user-initiated update or the AI-driven update.

Example 6 includes the method of any one of examples 1 to 5, including or excluding optional features. In this example, extracting the skills-related terms associated with the execution of the web-based application includes receiving a third-party input during the execution of the web-based application and automatically inferring skills-related terms corresponding to the third-party input.

Example 7 includes the method of any one of examples 1 to 6, including or excluding optional features. In this example, extracting the skills-related terms associated with the execution of the web-based application includes automatically extracting skills-related terms from a file that is accessed by the user.

Example 8 includes the method of any one of examples 1 to 7, including or excluding optional features. In this example, extracting the skills-related terms associated with the execution of the web-based application includes automatically extracting skills-related terms from one or more emails and/or one or more chat-based messages that are sent and/or received by the user.

Example 9 includes the method of any one of examples 1 to 8, including or excluding optional features. In this example, the incorporated standardized skill tags that match the imported standardized skill tags include identical standardized skill tags and/or related standardized skill tags, as determined by interfacing with the global skills graph via the API.

Example 10 includes the method of any one of examples 1 to 9, including or excluding optional features. In this example, the method includes extracting the skills-related terms and extracting the portion of the data objects using AI-based techniques.

Example 11 is a centralized skills management server. The centralized skills management server includes a processor, a web-based application, and a communication connection for connecting a remote computing system to the centralized skills management server through a network, where the remote computing system is operated by a user associated with a tenant. The centralized skills management server also includes a computer-readable storage medium operatively coupled to the processor. The computer-readable storage medium includes computer-executable instructions that, when executed by the processor, cause the processor to execute, via the network, the web-based application on the remote computing system, to extract skills-related terms associated with the execution of the web-based application, and to interface with a global skills graph via an API. The computer-executable instructions, when executed by the processor, also cause the processor to import standardized skill tags from the global skills graph, where the imported standardized skill tags relate to the extracted skills-related terms associated with the execution of the web-based application, as well as to access a property graph including data objects corresponding to the tenant, where the data objects include object metadata with incorporated standardized skill tags. The computer-executable instructions, when executed by the processor, further cause the processor to extract a portion of the data objects including object metadata with incorporated standardized skill tags that match the imported standardized skill tags relating to the extracted skills-related terms associated with the execution of the web-based application, as well as to surface, via the network, a skills-related functionality on the display of the remote computing system during the execution of the web-based application, where the skills-related functionality utilizes the extracted portion of the data objects.

Example 12 includes the centralized skills management server of example 11, including or excluding optional features. In this example, the computer-executable instructions, when executed by the processor, cause the processor to extract the skills-related terms associated with the execution of the web-based application by automatically inferring secondary skills-related terms that are related to the extracted skills-related terms. In addition, in this example, at least a portion of the imported standardized skill tags relate to the secondary skills-related terms.

Example 13 is the includes the centralized skills management server of example 11 or 12, including or excluding optional features. In this example, the skills-related functionality includes a skills-based recommendation functionality, a skills-based search functionality, a skills-based user profile update functionality, a tenant skills list standardization functionality, a skills-based reporting functionality, or some combination thereof.

Example 14 includes the centralized skills management server of any one of examples 11 to 13, including or excluding optional features. In this example, the computer-executable instructions, when executed by the processor, cause the processor to extract the skills-related terms associated with the execution of the web-based application by receiving a user input including one or more search terms and automatically inferring skills-related terms corresponding to the search term(s).

Example 15 includes the centralized skills management server of any one of examples 11 to 14, including or excluding optional features. In this example, the computer-executable instructions, when executed by the processor, cause the processor to extract the skills-related terms associated with the execution of the web-based application by automatically extracting skills-related terms from a file that is accessed by the user and/or automatically extracting skills-related terms from one or more emails and/or one or more chat-based messages that are sent and/or received by the user.

Example 16 includes the centralized skills management server of any one of examples 11 to 15, including or excluding optional features. In this example, the incorporated standardized skill tags that match the imported standardized skill tags include identical standardized skill tags and/or related standardized skill tags, as determined by interfacing with the global skills graph via the API.

Example 17 includes the centralized skills management server of any one of examples 11 to 16, including or excluding optional features. In this example, the computer-executable instructions, when executed by the processor, cause the processor to extract the skills-related terms and to extract the portion of the data objects using AI-based techniques.

Example 18 is a computer-readable storage medium. The computer-readable storage medium includes computer-executable instructions that, when executed by a processor, cause the processor to execute, via a network, a web-based application on a remote computing system operated by a user associated with a tenant, to extract, via the processor, skills-related terms associated with the execution of the web-based application, and to interface with a global skills graph via an API. The computer-executable instructions, when executed by the processor, also cause the processor to import standardized skill tags from the global skills graph, where the imported standardized skill tags relate to the extracted skills-related terms associated with the execution of the web-based application, as well as to access a property graph including data objects corresponding to the tenant, where the data objects include object metadata with incorporated standardized skill tags. The computer-executable instructions, when executed by the processor, further cause the processor to extract a portion of the data objects including object metadata with incorporated standardized skill tags that match the imported standardized skill tags relating to the extracted skills-related terms, as well as to surface, via the network, a skills-related functionality on the display of the remote computing system during the execution of the web-based application, where the skills-related functionality utilizes the extracted portion of the data objects.

Example 19 includes the computer-readable storage medium of example 18, including or excluding optional features. In this example, the computer-executable instructions, when executed by the processor, cause the processor to extract the skills-related terms associated with the execution of the web-based application by receiving a user input including one or more search terms and automatically inferring skills-related terms corresponding to the search term(s).

Example 20 includes the computer-readable storage medium of example 18 or 19, including or excluding optional features. In this example, the computer-executable instructions, when executed by the processor, cause the processor to extract the skills-related terms associated with the execution of the web-based application by automatically extracting skills-related terms from a file that is accessed by the user and/or automatically extracting skills-related terms from one or more emails and/or one or more chat-based messages that are sent and/or received by the user.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method for skills inference within the context of a global skills graph, wherein the method is implemented in a computing system comprising a processor, and wherein the method comprises:

executing, via a network, a web-based application on a remote computing system associated with a tenant organization, the web-based application being operated by a human capital management (HCM) department of the tenant organization;

extracting, via the processor, skills-related terms associated with the execution of the web-based application from emails sent or received by employees of the tenant organization;

interfacing with a global skills graph via an application programming interface (API);

importing standardized skill tags from the global skills graph, wherein the imported standardized skill tags relate to the extracted skills-related terms;

accessing a property graph comprising data objects corresponding to the tenant organization, wherein the data objects comprise object metadata with incorporated standardized skill tags;

extracting a portion of the data objects comprising the object metadata with incorporated standardized skill tags that match the imported standardized skill tags relating to the extracted skills-related terms; and surfacing, via the network, a skills-related functionality on a display of the remote computing system during the execution of the web-based application, the skills-related functionality providing a skills-based recommendation functionality, a skills-based search functionality, a skills-based user profile update functionality, a tenant skills list standardization functionality, and a skills-based reporting functionality used by the HCM department of the tenant organization, wherein the skills-related functionality utilizes the extracted portion of the data objects to standardize skills data of the employees of the tenant organization across the skills-based recommendation functionality, the skills-based search functionality, the skills-based user profile update functionality, the tenant skills list standardization functionality, and the skills-based reporting functionality for use by the HCM department of the tenant organization.

2. The method of claim 1, wherein extracting the skills-related terms associated with the execution of the web-based application further comprises automatically inferring secondary skills-related terms that are related to the extracted skills-related terms, and wherein at least a portion of the imported standardized skill tags relate to the secondary skills-related terms.

3. The method of claim 1, wherein extracting the skills-related terms associated with the execution of the web-based application comprises:

receiving a user input comprising a search term; and
automatically inferring at least one of the skills-related terms corresponding to the search term.

4. The method of claim 1, wherein extracting the skills-related terms associated with the execution of the web-based application comprises:
receiving a user-initiated update or an artificial intelligence (AI)-driven update to a user profile corresponding to the user; and
automatically inferring at least one of the skills-related terms corresponding to the user-initiated update or the AI-driven update.

5. The method of claim 1, wherein extracting the skills-related terms associated with the execution of the web-based application comprises:
receiving a third-party input during the execution of the web-based application; and
automatically inferring at least one of the skills-related terms corresponding to the third-party input.

6. The method of claim 1, wherein extracting the skills-related terms associated with the execution of the web-based application comprises automatically extracting at least one of the skills-related terms from the emails sent or received by the employees of the tenant organization.

7. The method of claim 1, wherein extracting the skills-related terms associated with the execution of the web-based application comprises automatically extracting at least one of the skills-related terms from a chat-based message that was sent or received by the employees of the tenant organization.

8. The method of claim 1, wherein the incorporated standardized skill tags that match the imported standardized skill tags comprise at least one of identical standardized skill tags or related standardized skill tags, as determined by interfacing with the global skills graph via the API.

9. The method of claim 1, wherein extracting the skills-related terms associated with the execution of the web-based application comprises extracting at least one of the skills-related terms using artificial intelligence (AI)-based techniques.

10. A centralized skills management server, comprising:
a processor;
a web-based application;
a communication connection for connecting a remote computing system to the centralized skills management server through a network, wherein the remote computing system is associated with a tenant organization; and
a computer-readable storage medium operatively coupled to the processor, the computer-readable storage medium comprising computer-executable instructions that, when executed by the processor, cause the processor to:
execute, via the network, the web-based application on the remote computing system, the web-based application being operated by a human capital management (HCM) department of the tenant organization;
extract skills-related terms associated with the execution of the web-based application from emails sent or received by employees of the tenant organization;
interface with a global skills graph via an application programming interface (API);
import standardized skill tags from the global skills graph, wherein the imported standardized skill tags relate to the extracted skills-related terms;
access a property graph comprising data objects corresponding to the tenant organization, wherein the data objects comprise object metadata with incorporated standardized skill tags;
extract a portion of the data objects comprising the object metadata with incorporated standardized skill tags that match the imported standardized skill tags relating to the extracted skills-related terms; and
surface, via the network, a skills-related functionality on a display of the remote computing system during the execution of the web-based application, the skills-related functionality providing a skills-based recommendation functionality, a skills-based search functionality, a skills-based user profile update functionality, a tenant skills list standardization functionality, and a skills-based reporting functionality used by the HCM department of the tenant organization, wherein the skills-related functionality utilizes the extracted portion of the data objects to standardize skills data of the employees of the tenant organization across the skills-based recommendation functionality, the skills-based search functionality, the skills-based user profile update functionality, the tenant skills list standardization functionality, and the skills-based reporting functionality for use by the HCM department of the tenant organization.

11. The centralized skills management server of claim 10, wherein the computer-executable instructions, when executed by the processor, cause the processor to extract the skills-related terms associated with the execution of the web-based application by automatically inferring secondary skills-related terms that are related to the extracted skills-related terms, and wherein at least a portion of the imported standardized skill tags relate to the secondary skills-related terms.

12. The centralized skills management server of claim 10, wherein the computer-executable instructions, when executed by the processor, cause the processor to extract the skills-related terms associated with the execution of the web-based application by:
receiving a user input comprising a search term; and
automatically inferring skills-related terms corresponding to the search term.

13. The centralized skills management server of claim 10, wherein the computer-executable instructions, when executed by the processor, cause the processor to automatically extract the skills-related terms from both the emails sent or received by the employees of the tenant organization and a chat-based message that was sent or received by the employees of the tenant organization.

14. The centralized skills management server of claim 10, wherein the incorporated standardized skill tags that match the imported standardized skill tags comprise at least one of identical standardized skill tags or related standardized skill tags, as determined by interfacing with the global skills graph via the API.

15. The centralized skills management server of claim 10, wherein the computer-executable instructions, when executed by the processor, cause the processor to extract at least one of the skills-related terms using artificial intelligence (AI)-based techniques.

16. A computer-readable storage medium comprising computer-executable instructions that, when executed by a processor, cause the processor to:
execute, via a network, a web-based application on a remote computing system associated with a tenant organization, the web-based application being operated by a human capital management (HCM) department of the tenant organization;

extract, via the processor, skills-related terms associated with the execution of the web-based application from emails sent or received by employees of the tenant organization;

interface with a global skills graph via an application programming interface (API);

import standardized skill tags from the global skills graph, wherein the imported standardized skill tags relate to the extracted skills-related terms;

access a property graph comprising data objects corresponding to the tenant organization, wherein the data objects comprise object metadata with incorporated standardized skill tags;

extract a portion of the data objects comprising the object metadata with incorporated standardized skill tags that match the imported standardized skill tags relating to the extracted skills-related terms; and surface, via the network, a skills-related functionality on a display of the remote computing system during the execution of the web-based application, the skills-related functionality providing a skills-based recommendation functionality, a skills-based search functionality, a skills-based user profile update functionality, a tenant skills list standardization functionality, and a skills-based reporting functionality used by the HCM department of the tenant organization, wherein the skills-related functionality utilizes the extracted portion of the data objects to standardize skills data of the employees of the tenant organization across the skills-based recommendation functionality, the skills-based search functionality, the skills-based user profile update functionality, the tenant skills list standardization functionality, and the skills-based reporting functionality for use by the HCM department of the tenant organization.

17. The computer-readable storage medium of claim 16, wherein the computer-executable instructions, when executed by the processor, cause the processor to extract the skills-related terms associated with the execution of the web-based application by: receiving a user input comprising a search term; and automatically inferring skills-related terms corresponding to the search term.

18. The computer-readable storage medium of claim 16, wherein the computer-executable instructions, when executed by the processor, cause the processor to automatically extract the skills-related terms from both the emails sent or received by the employees of the tenant organization and a chat-based message that was sent or received by the employees of the tenant organization.

* * * * *